(12) United States Patent
Niemi

(10) Patent No.: US 11,970,345 B2
(45) Date of Patent: *Apr. 30, 2024

(54) BUCKET ELEVATOR ADJUSTABLE GUIDE SYSTEM

(71) Applicant: S-M Enterprises, Inc., Moorhead, MN (US)

(72) Inventor: Dale W. Niemi, Moorhead, MN (US)

(73) Assignee: S-M Enterprises, Inc., Moorhead, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,720

(22) Filed: Apr. 24, 2023

(65) Prior Publication Data

US 2023/0257217 A1 Aug. 17, 2023

Related U.S. Application Data

(63) Continuation of application No. 17/699,403, filed on Mar. 21, 2022, now Pat. No. 11,667,481, which is a continuation of application No. 17/117,355, filed on Dec. 10, 2020, now Pat. No. 11,292,674.

(51) Int. Cl.
| | |
|---|---|
| *B65G 47/95* | (2006.01) |
| *B65G 17/12* | (2006.01) |
| *B65G 43/00* | (2006.01) |
| *B65G 47/44* | (2006.01) |
| *B65G 47/82* | (2006.01) |

(52) U.S. Cl.
CPC ............ *B65G 47/95* (2013.01); *B65G 43/00* (2013.01); *B65G 47/44* (2013.01); *B65G 47/82* (2013.01); *B65G 17/126* (2013.01); *B65G 2812/02712* (2013.01)

(58) Field of Classification Search
None
See application file for complete search history.

(56) References Cited

U.S. PATENT DOCUMENTS

| | | |
|---|---|---|
| 688,684 A | 12/1901 | Piez |
| 697,716 A | 4/1902 | Hartzell |
| 1,462,126 A | 7/1923 | Ross |
| 2,084,920 A | 6/1937 | Schrag |
| 2,339,938 A | 1/1944 | Meyer |
| 2,557,325 A | 6/1951 | Transeau |

(Continued)

*Primary Examiner* — William R Harp
(74) *Attorney, Agent, or Firm* — Neustel Law Offices

(57) ABSTRACT

A bucket elevator adjustable guide system for efficiently transferring and dispensing particulate material from a bucket elevator includes a head housing connected to the bucket elevator, an adjustable guide member disposed therein, an extendable and retractable adjustment member connected to the guide member, a remotely controllable drive unit coupled to the adjustment member, and a remote control. The head housing receives buckets of particulate material to be dispensed from the bucket elevator. The guide member extends in a curved arc over the buckets to engage and guide discharged particulate material into a discharge chute. Remote controls enable the drive unit to be manually or automatically controlled to cause the adjustment member to extend or retract to adjust the position and configuration of the guide member and affect the transfer and dispensing of the particulate material without physically accessing the adjustment member.

20 Claims, 19 Drawing Sheets

(56) References Cited

U.S. PATENT DOCUMENTS

| | | | |
|---|---|---|---|
| 2,633,225 | A | 3/1953 | Diebold |
| 2,670,839 | A | 3/1954 | Aasland |
| 2,727,669 | A | 12/1955 | Sackett |
| 2,965,379 | A | 12/1960 | Bruce |
| 3,565,288 | A | 2/1971 | Shute |
| 3,580,641 | A | 5/1971 | Schloss, Jr. |
| 3,695,224 | A | 10/1972 | Royka |
| 4,333,561 | A | 6/1982 | Schlegel |
| 4,875,889 | A | 10/1989 | Hagerer |
| 5,178,256 | A | 1/1993 | Anderson |
| 5,286,158 | A | 2/1994 | Zimmerman |
| 5,289,911 | A | 3/1994 | Compton |
| 5,469,957 | A | 11/1995 | Seymour |
| 6,419,093 | B2 | 7/2002 | Boese |
| 7,938,613 | B2 | 5/2011 | Yoder |
| 9,181,038 | B1 | 11/2015 | Niemi |
| 9,382,072 | B1 | 7/2016 | Niemi |
| 9,540,178 | B2 | 1/2017 | Niemi |
| 9,903,079 | B2 | 2/2018 | Palicki |
| 11,292,674 | B1 | 4/2022 | Niemi |
| 11,667,481 | B2 * | 6/2023 | Niemi .................... B65G 43/00 193/2 R |
| 2011/0203247 | A1 | 8/2011 | Berthet |
| 2016/0304284 | A1 | 10/2016 | Niemi |

\* cited by examiner

BUCKET ELEVATOR ADJUSTABLE GUIDE SYSTEM

CROSS REFERENCE TO RELATED APPLICATIONS

The present application is a continuation of U.S. application Ser. No. 17/699,403 filed on Mar. 21, 2022, which is a continuation of U.S. Application Ser. No. 17/117,355 filed on Dec. 10, 2020 now issued as U.S. Pat. No. 11,292,674. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a bucket elevator adjustable guide system for efficiently dispensing particulate materials such as grain from a bucket elevator while reducing undesirable dispersion of such materials and particles thereof.

Related Art

Any discussion of the related art throughout the specification should in no way be considered as an admission that such related art is widely known or forms part of common general knowledge in the field.

Bucket elevators (a.k.a. bucket conveyors) are commonly utilized to elevate particulate materials (e.g., grain) from one elevation to a second higher elevation for dispensing. Conventional bucket elevators comprise a plurality of buckets attached to an elongated flexible structure (e.g., a belt or chain). The flexible structure passes in a continuous loop over and between an upper pulley and a lower pulley such that the attached buckets move in an upward extending run on one side of the loop and in a downward extending run on the opposite side of the loop. At a lower portion of the loop on the downward extending run, empty buckets collect particulate material present in a boot portion of the bucket elevator and then pass around the lower pulley of the bucket elevator. The buckets with particulate material then continue to move upwardly along the upward run of the loop. A motor drives at least one of the pulleys, generally the lower pulley, and therefore drives the elongated flexible structure with the buckets continuously around the loop. At the upper pulley of the bucket elevator, the buckets dispense the particulate material which then exits the bucket elevator through a discharge chute. Vertically orientated bucket elevators often generate a centrifugal force that directs the particulate material out of the buckets and into the discharge chute and are thus often referred to as "centrifugal discharge elevators."

One of the problems with conventional bucket elevators is that the centrifugal force can cause some of the particulate material being elevated and particles thereof to be directed upwardly and outwardly into engagement with a ceiling or other surface of the bucket elevator rather than directly into the discharge chute. This can result in dispersion of the particulate material and create turbulence in the flow that can reduce the flow rate of the material. Some of the material and particles thereof may also be deflected rather than entering the discharge tube and return to the boot as a result of gravity. Both conditions negatively impact the efficiency of operation of the bucket elevator.

The present inventor has addressed such shortcomings of conventional bucket elevators with a manually adjustable guide system which is described in U.S. Pat. Nos. 9,540,178, 9,382,072, and 9,181,038. However, the present inventor now envisions additional improvements with respect to a manually adjustable guide system which will improve ease of setup and use, reduce the time necessary for operations, and further improve the efficiency of operation.

SUMMARY

An example embodiment is directed to a bucket elevator adjustable guide system. The bucket elevator adjustable guide system generally includes a head housing for receiving particulate material to be dispensed from a bucket elevator, an adjustable guide member disposed at least partially within the head housing for guiding the particulate material to be dispensed, and an adjustment member connected to the adjustable guide member. In some embodiments, the head housing may include a first opening for receiving the particulate material from the bucket elevator and a second opening for discharging the particulate material. In some embodiments, the adjustable guide member may comprise a substantially flat sheet of material arranged in a curved arc and extending at least partially between the first and second openings to guide the particulate material to the second opening.

In some embodiments, the adjustment member may be connected to the adjustable guide member by a pivotable connection at a single connection point. In some embodiments, the adjustment member may be connected to the adjustable guide member by a pivotable connection at a plurality of spaced apart connection points.

The adjustment member is adapted to selectively adjust the position of the adjustable guide member relative to the head housing without the adjustment member being physically accessed. According to one aspect, the adjustment member may also be adapted to selectively adjust the configuration of the adjustable guide member without the adjustment member being physically accessed.

In some embodiments, the bucket elevator adjustable guide system may include a manual or an automatic remote control for selectively manually or automatically remotely controlling the adjustment member to adjust the position of the guide member relative to the head housing without the adjustment member being physically accessed. In some embodiments, the remote control may comprise a mobile device. In some embodiments, the remote control may wirelessly control the adjustment member. In some embodiments, the remote control may monitor a selected operating parameter of the bucket elevator and in response automatically control the adjustment member to adjust the position of the guide member to maximize the operating efficiency of the bucket elevator.

In some embodiments, the bucket elevator adjustable guide system may include a drive unit coupled to the adjustment member. The drive unit may be remotely controllable manually or automatically to selectively cause the adjustment member to adjust the position of the guide member relative to the head housing without the adjustment member being physically accessed.

In some embodiments, the adjustment member may be selectively extendable and retractable and the drive unit may be adapted to selectively cause the adjustment member to extend and retract. The remote control may be used to remotely control the drive unit to selectively cause the adjustment member to extend and retract to selectively adjust the position and/or configuration of the adjustable guide member in relation to the head housing without the drive unit or the adjustment member being physically accessed.

In some embodiments, the adjustment member may include an elongated shaft that is extendable and retractable. The adjustment member may be adapted to adjust the position of the adjustable guide member relative to the head housing in a first direction by extending the shaft, and to adjust the position of the adjustable guide member in a second direction by retracting the shaft.

In some embodiments, the elongated shaft may have a proximal end portion pivotably connected to the guide member and a distal end portion coupled to the drive unit. The shaft may be rotatable, and the adjustment member may extend when the shaft rotates in a first direction and retract when the shaft rotates in a second direction. The drive unit may be adapted to selectively cause the shaft to rotate in the first and second directions.

In some embodiments, the adjustment member may comprise a plurality of spaced apart elongated shafts each of which is extendable and retractable. The adjustment member may be adapted to adjust the position of the adjustable guide member relative to the head housing in a first direction by extending the plurality of shafts, and to adjust the position of the adjustable guide member in a second direction by retracting the plurality of shafts.

In some embodiments, each shaft may have a proximal end portion pivotably connected to the guide member at a spaced apart location and a distal end portion coupled to the drive unit. Each shaft may be rotatable, and the adjustment member may extend when the shafts rotate in a first direction and retract when the shafts rotate in a second direction. The drive unit may be adapted to selectively cause the shafts to rotate in the first and second directions in common.

In some embodiments, the bucket elevator adjustable guide system may include a plurality of drive units and the adjustment member may include a plurality of elongated spaced apart shafts, each with a proximal end portion pivotably connected to a portion of the guide member at a spaced apart location and a distal end portion coupled to one of the plurality of drive units. Each shaft may be rotatable, and may extend when rotated in a first direction and retract when rotated in a second direction. Each drive unit may be adapted to independently selectively drive a shaft to rotate in the first and second directions to adjust the position of the guide member without the drive unit or the adjustment member being physically accessed.

There has thus been outlined, rather broadly, some of the embodiments of the bucket elevator adjustable guide system in order that the detailed description thereof may be better understood, and in order that the present contribution to the art may be better appreciated. There are additional embodiments of the bucket elevator adjustable guide system that will be described hereinafter and that will form the subject matter of the claims appended hereto. In this respect, before explaining at least one embodiment of the bucket elevator adjustable guide system in detail, it is to be understood that the bucket elevator adjustable guide system is not limited in its application to the details of construction or to the arrangements of the components set forth in the following description or illustrated in the drawings. The bucket elevator adjustable guide system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
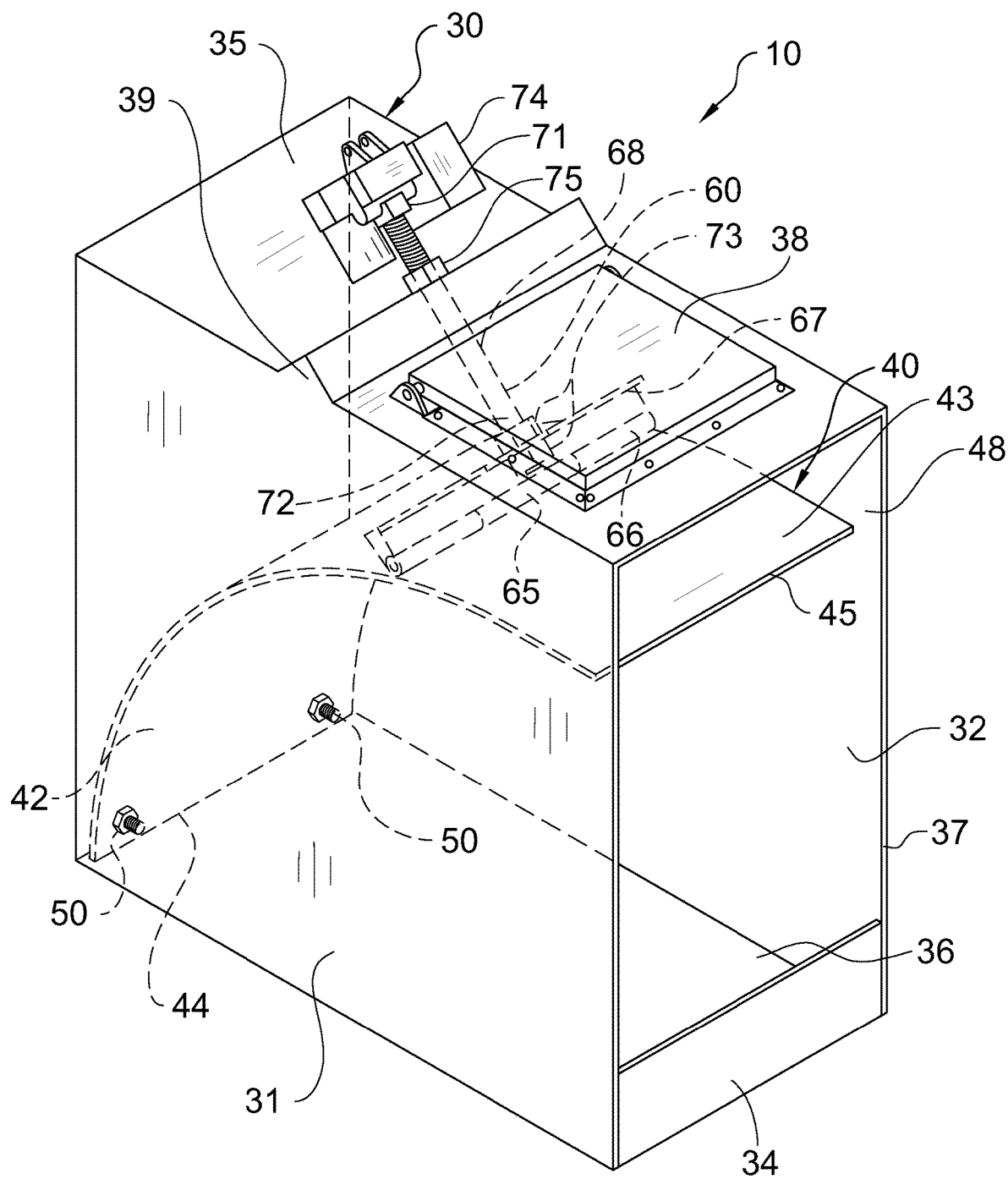
FIG. 1 is an upper perspective view of a bucket elevator adjustable guide system in accordance with an example embodiment.
Figure 2:
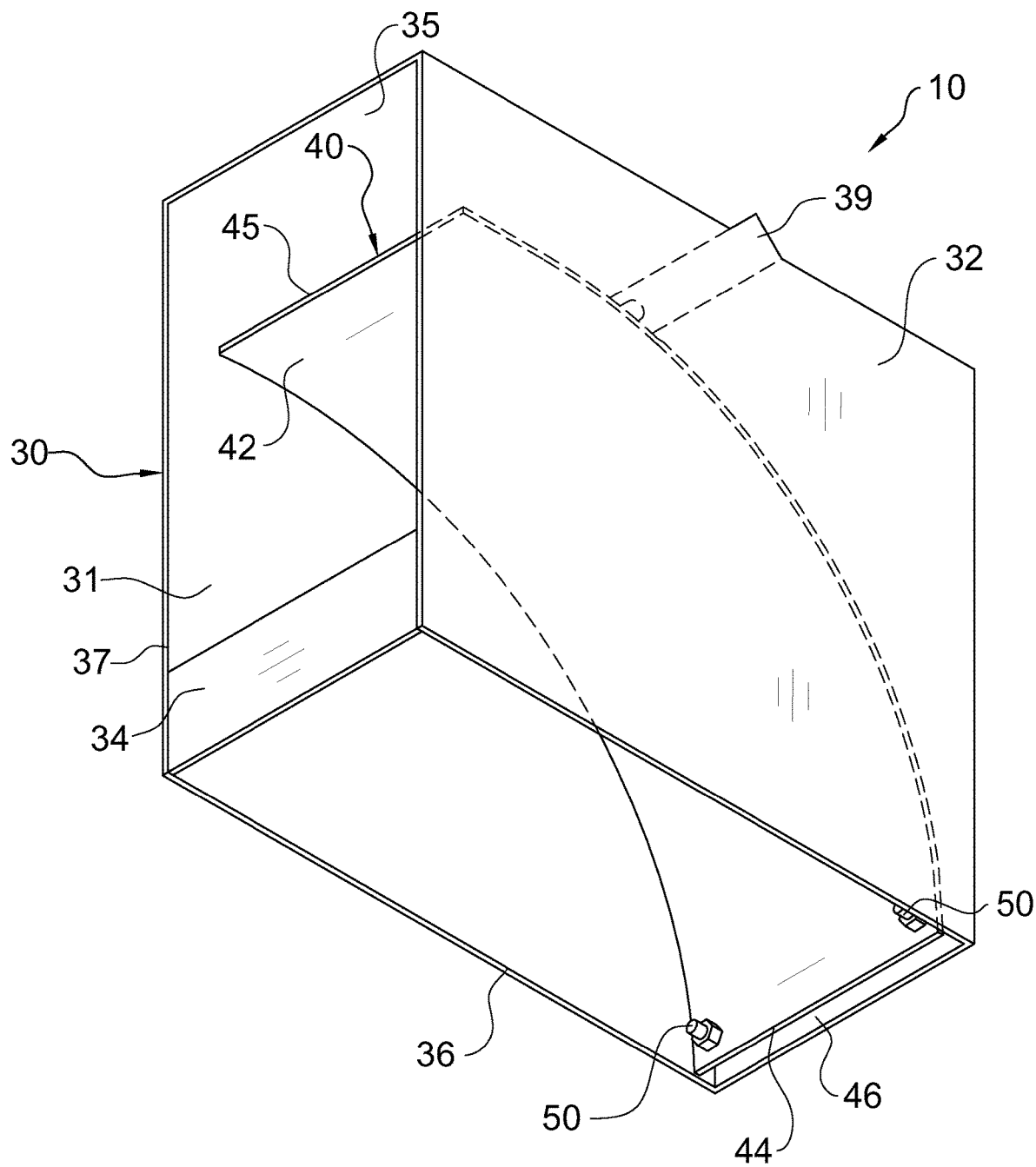
FIG. 2 is a lower perspective view of a bucket elevator adjustable guide system in accordance with an example embodiment.
Figure 3:
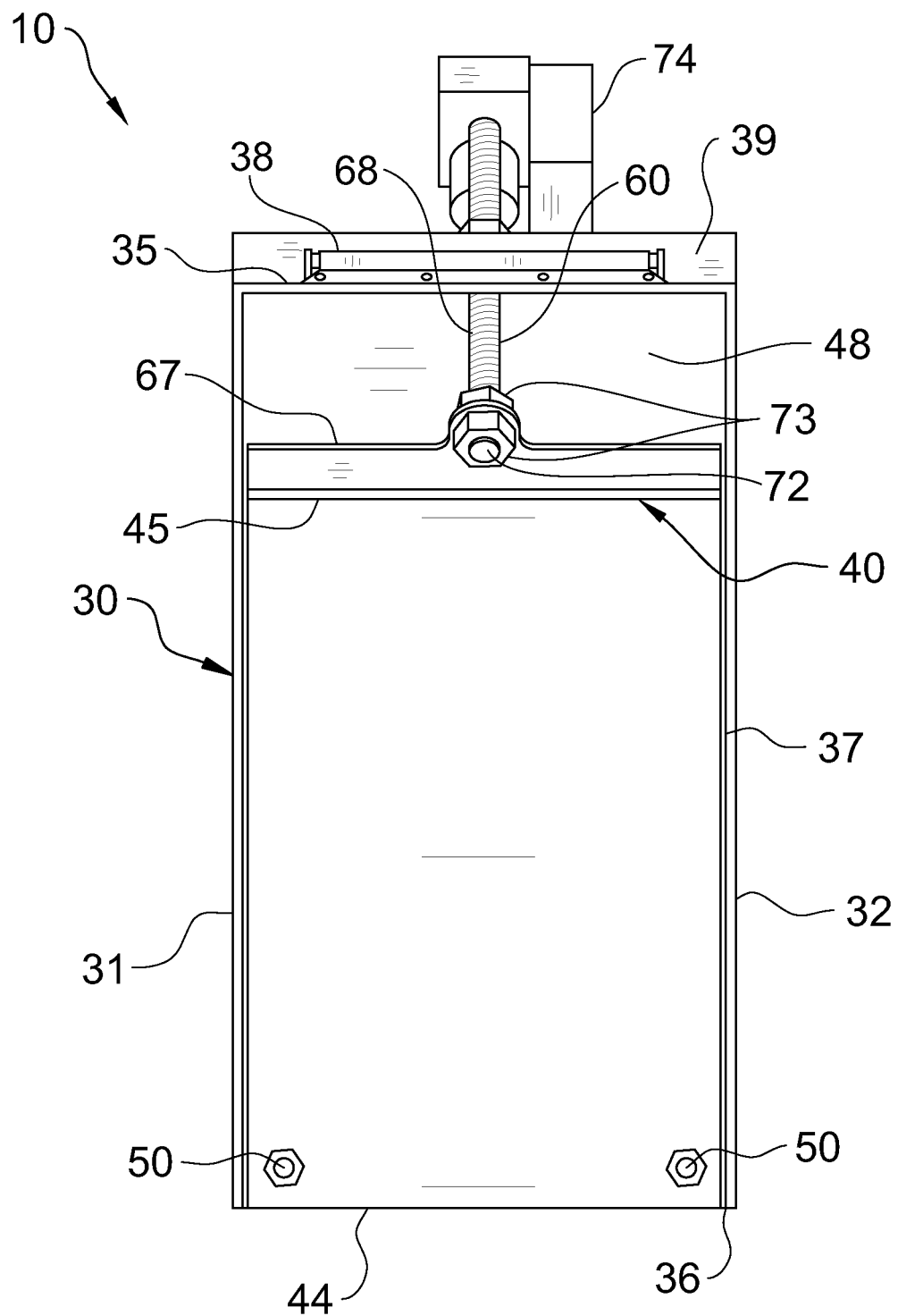
FIG. 3 is a front view of a bucket elevator adjustable guide system in accordance with an example embodiment.
Figure 4:
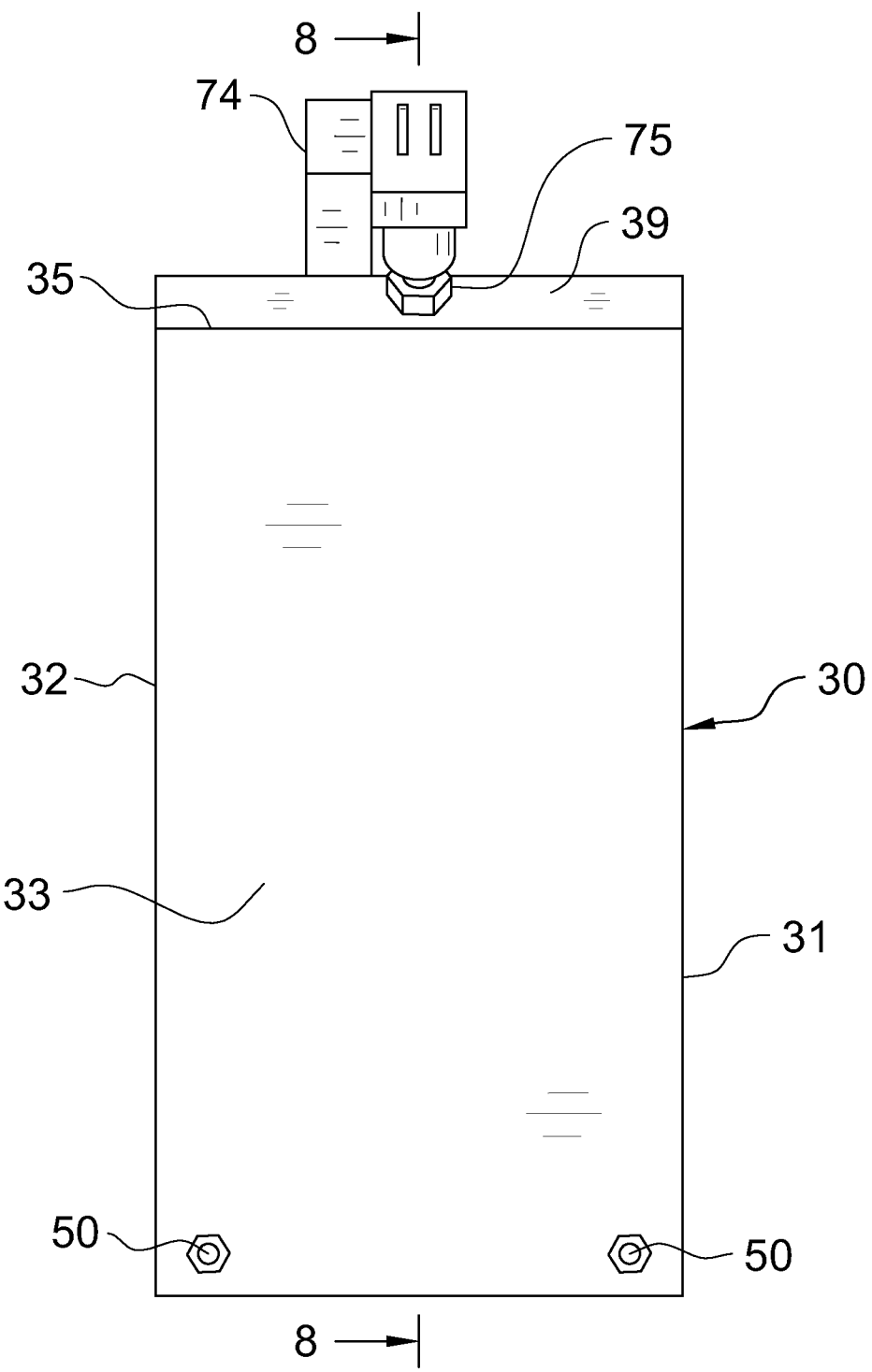
FIG. 4 is a rear view of a bucket elevator adjustable guide system in accordance with an example embodiment.
Figure 5:
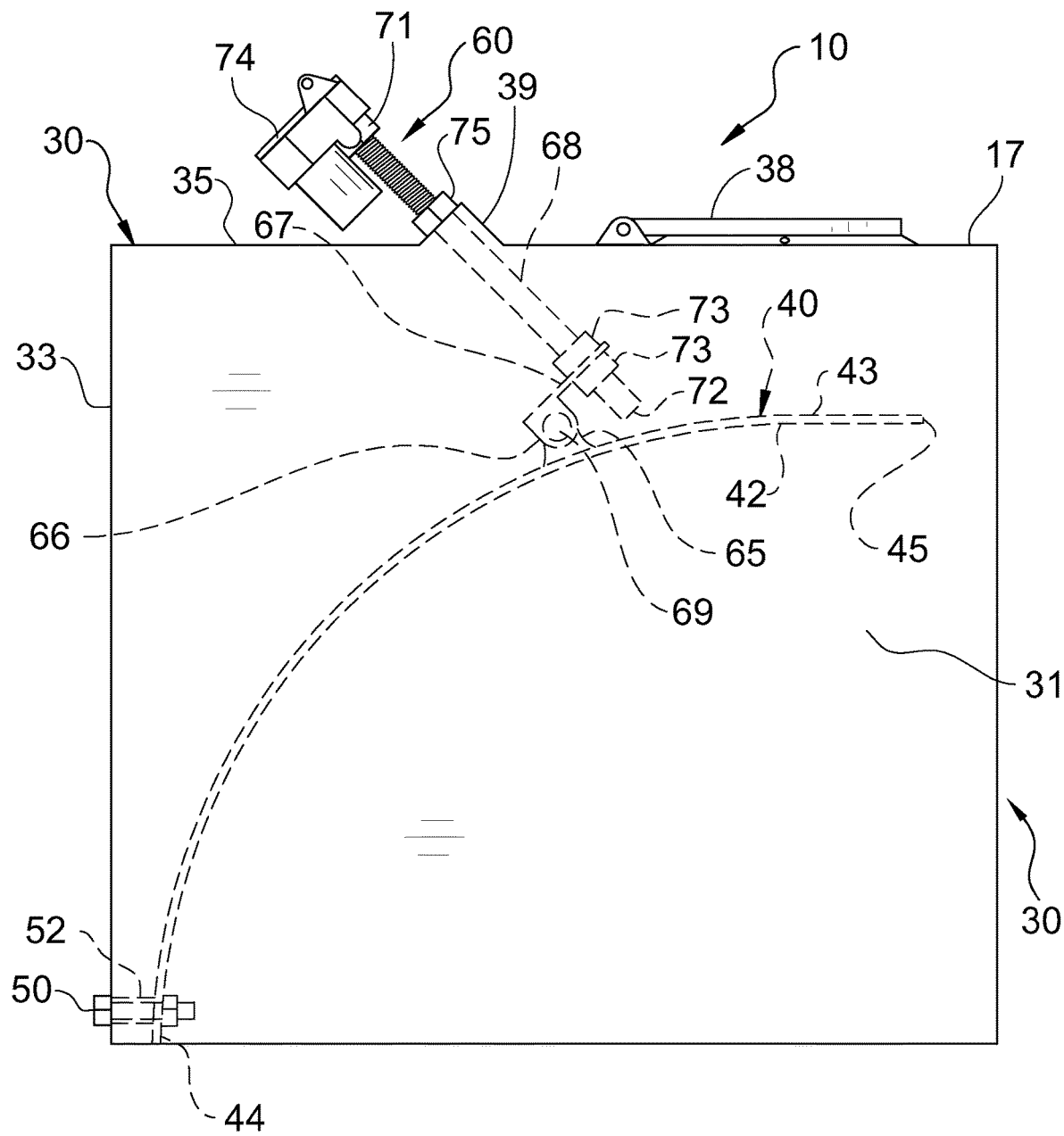
FIG. 5 is a side view of a bucket elevator adjustable guide system in accordance with an example embodiment.
Figure 6:
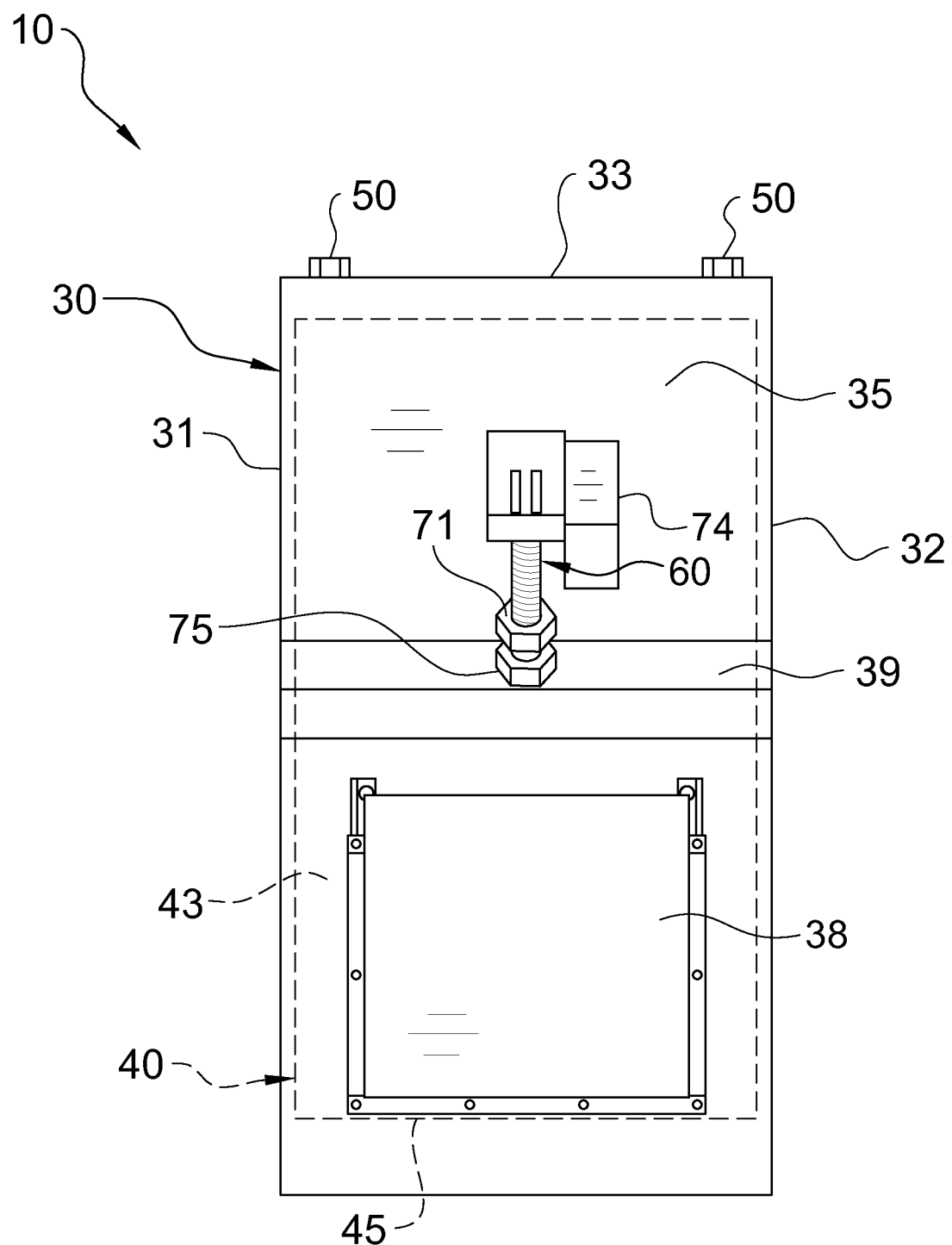
FIG. 6 is a top view of a bucket elevator adjustable guide system in accordance with an example embodiment.
Figure 7:
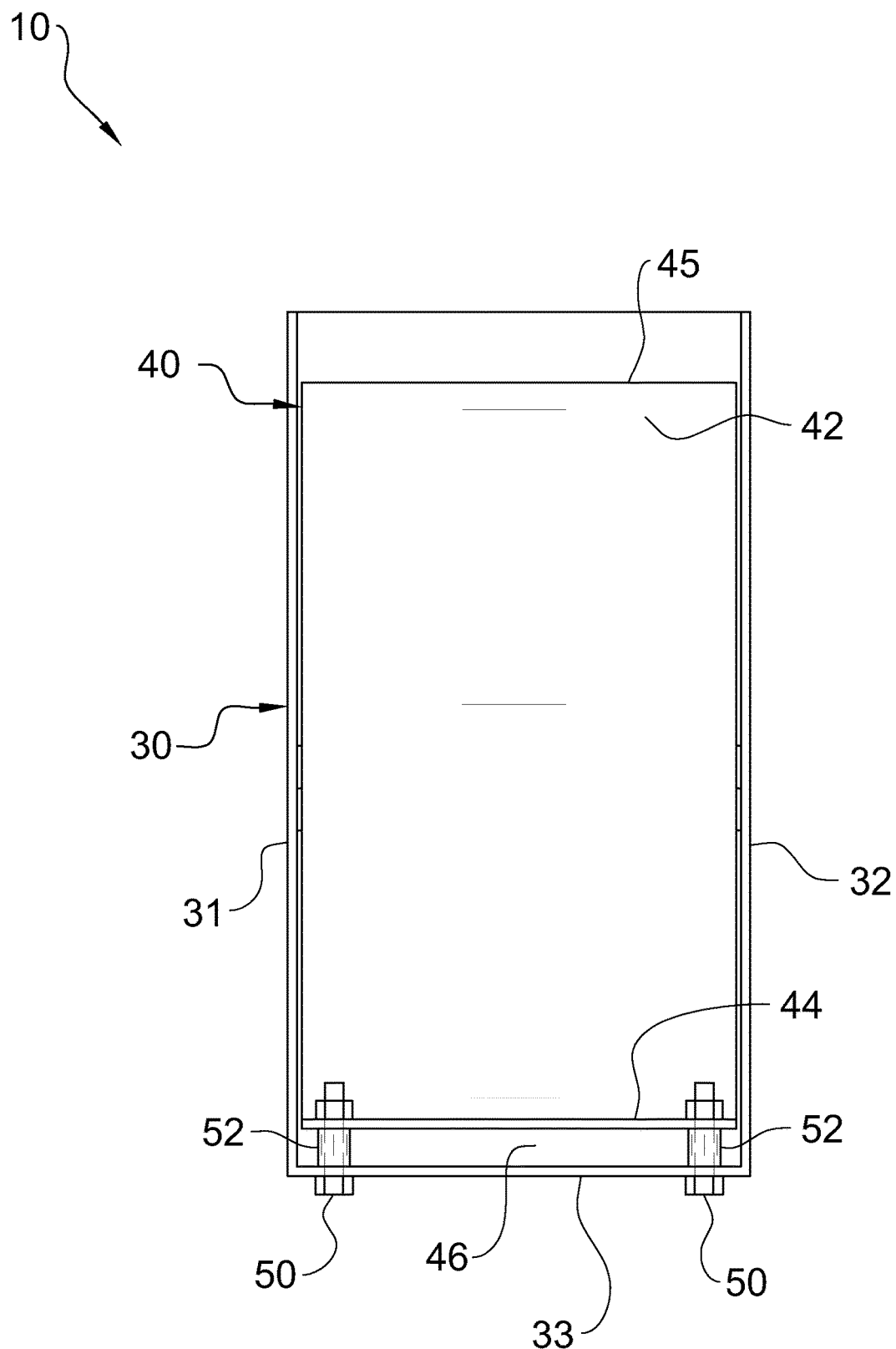
FIG. 7 is a bottom view of a bucket elevator adjustable guide system in accordance with an example embodiment.

A detailed description of example embodiments of a bucket elevator adjustable guide system 10 is provided herein with reference to drawing FIGS. 1-18 in which like reference numbers are used to denote like elements.

A. Overview

An example bucket elevator adjustable guide system 10 generally includes a head housing 30 for a bucket elevator 12, a positionable and configurable guide member 40 disposed at least partially within the head housing 30, and an adjustment member 60 connected to the guide member 40 and adapted to operate to adjust the position and configuration of the guide member 40. Also included are a drive unit 74 coupled to the adjustment member 60, and a control system 80 for remotely communicating with and controlling the drive unit 74 to cause the adjustment member 60 to adjust the position and configuration of the guide member 40 within the head housing 30 to efficiently transfer and discharge a particulate material 13 such as a grain from the bucket elevator 12 either manually on demand, automatically, or both.

The bucket elevator 12 typically comprises an elongated flexible structure 22 such as a belt or chain with a plurality of buckets 24 connected thereto. The elongated flexible structure 22 is driven in a loop around upper and lower pulleys between a lower boot where the buckets 24 pick up loads of the particulate material 13 and an upper discharge point where the particulate material 13 is discharged from the buckets 24 under centrifugal force into a discharge chute 17.

The head housing 30 is connected or attached to an upper portion 16 of an enclosure or housing 14 of the bucket elevator 12. The head housing 30 comprises one or more lower openings 36 through which the buckets 24 pass as they travel between the boot and the discharge point. The head housing 30 also comprises a discharge opening 37 through which the particulate material 13 is discharged from the buckets 24 into the discharge chute 17. The head housing 30 forms at least a partially enclosure around the lower openings 36 and the discharge opening 37 to contain the particulate material 13 as it is discharged.

The guide member 40 is at least partially disposed within the head housing 30 to guide the particulate material 13 discharged from the buckets 24 through the discharge opening 37 and into the discharge chute 17 while limiting unwanted dispersion of the particulate material 13 and particles thereof. The guide member 40 preferably comprises a flat sheet of material with a lower end portion 44 connected to a lower portion of the head housing 30 near where the buckets 24 enter and an upper end portion 45 that extends in a curved arc over the buckets 24 and the discharge point and into the discharge opening 37. As the particulate material 13 is discharged from the buckets 24 under centrifugal force, it engages the guide member 40 and is guided toward and into the discharge opening 37 and the discharge chute 17.

The adjustment member 60 is connected to the upper end portion 45 of the guide member 40 and is adapted to adjust the position and configuration of the guide member 40 within the head housing 30 to improve the efficiency of transfer of the particulate material 13 for different conditions and different types of particulate material 13. The adjustment member 60 comprises an elongated rotatable shaft 68 with a proximal end portion 71 exterior to the head housing 30 and a distal end portion 72 that extends into the head housing 30 and is pivotably connected to the upper end portion 45 of the guide member 40. Rotation of the elongated shaft 68 causes the distal end portion 72 to extend or retract within the head housing 30 depending on the direction of rotation. The extension and retraction of the adjustment member 60 adjusts the position of the guide member 40 relative to the head housing 30 by forcing the upper end portion 45 to move further downward and forward toward the discharge opening 37 or further upward and rearward away from the discharge opening 37. It also adjusts the configuration of the guide member 40 by changing the elevation and angle of the upper portion 45, the angle of the lower portion 44, and the spacing between the surfaces of the guide member 40 and the head housing 30.

The drive unit 74 is coupled to the proximal end portion 71 of the shaft 68 of the adjustment member 60 and is adapted to selectively rotatably drive the shaft 68 to extend and retract the distal end portion 72 within the head housing 30 to selectively adjust the position and configuration of the guide member 40. The drive unit 74 is adapted to be remotely controlled by the control system 80 without any physical access by an operator. This enables the position and configuration of the guide member 40 to be adjusted safely either manually on demand by an operator or automatically in real-time without physical access by an operator and even while the bucket elevator 12 is operating to optimize the flow rate of the particulate material 13 and/or the operating efficiency of the bucket elevator 12 during the transfer and dispensing process.

B. Bucket Elevator

The bucket elevator 12 may comprise any conventional bucket elevator or bucket conveyor adapted for moving volumes of particulate material 13 from a first location to a second location for dispensing. The second location will often be but need not necessarily always be elevated in relation to the first location. Solely for purposes of describing example embodiments of the bucket elevator adjustable guide system 10, the bucket elevator 12 is shown and described herein as being substantially vertical. However, those skilled in the art will appreciate that the bucket elevator 12 may be arranged and oriented to move the particulate material 13 at any angle between substantially vertical and substantially horizontal as determined by the needs of a particular application.

The example embodiments of the bucket elevator adjustable guide system 10 described herein are particularly suitable for use with a centrifugal discharge-type bucket elevator, but can also be favorably used with various other types of bucket elevators. The example embodiments of the bucket elevator adjustable guide system 10 described herein are also particularly suitable for use with a bucket elevator 12 designed for use in moving grain as the particulate material 13, but may also be favorably utilized with other bucket elevators 12 adapted to move other non-grain organic particulate materials, such as fertilizer, and other inorganic particulate materials, for example sand, gravel, or the like. One example of a bucket elevator is shown and described in U.S. Pat. No. 1,944,932 to Gemeny, which is incorporated by reference herein.

The bucket elevator 12 may comprise an enclosure or housing 14 which has a lower portion 15 and an upper portion 16 and which may be substantially vertical. The lower portion 15 may comprise a boot for receiving and holding the particulate material 13 to be moved and dispensed. The upper portion 16 comprises a discharge chute 17 that extends outwardly from the upper portion 16 for dispensing the particulate material 13.

The enclosure or housing 14 defines an interior space 18 that may be subdivided into multiple separate spaces by one or more elongated substantially vertical tubular or other-shaped legs. The upper portion 16 comprises one or more openings 19 which are adapted for buckets 24 to pass through as described further below. The openings 19 preferably are arranged to correspond with openings of the one or more legs if present.

A head housing 30 (sometimes referred to as a "hood"), which is described further below, is adapted to be connected to or to be formed as part of the upper portion 16 of the enclosure or housing 14. The head housing 30 comprises an at least partial enclosure with one or more lower openings 36 and a discharge opening 37. The one or more lower openings 36 preferably are arranged to correspond with and to be in communication with the one or more openings 19 of the upper portion 16 of the enclosure or housing 14 to enable buckets 24 to pass through between the upper portion 16 of the enclosure or housing 14 of the bucket elevator 12 and the head housing 30. The discharge opening 37 is preferably in communication with the discharge chute 17 of the enclosure or housing 14 of the bucket elevator 12 for dispensing the particulate material 13 through the discharge chute 17.

Figure 10:
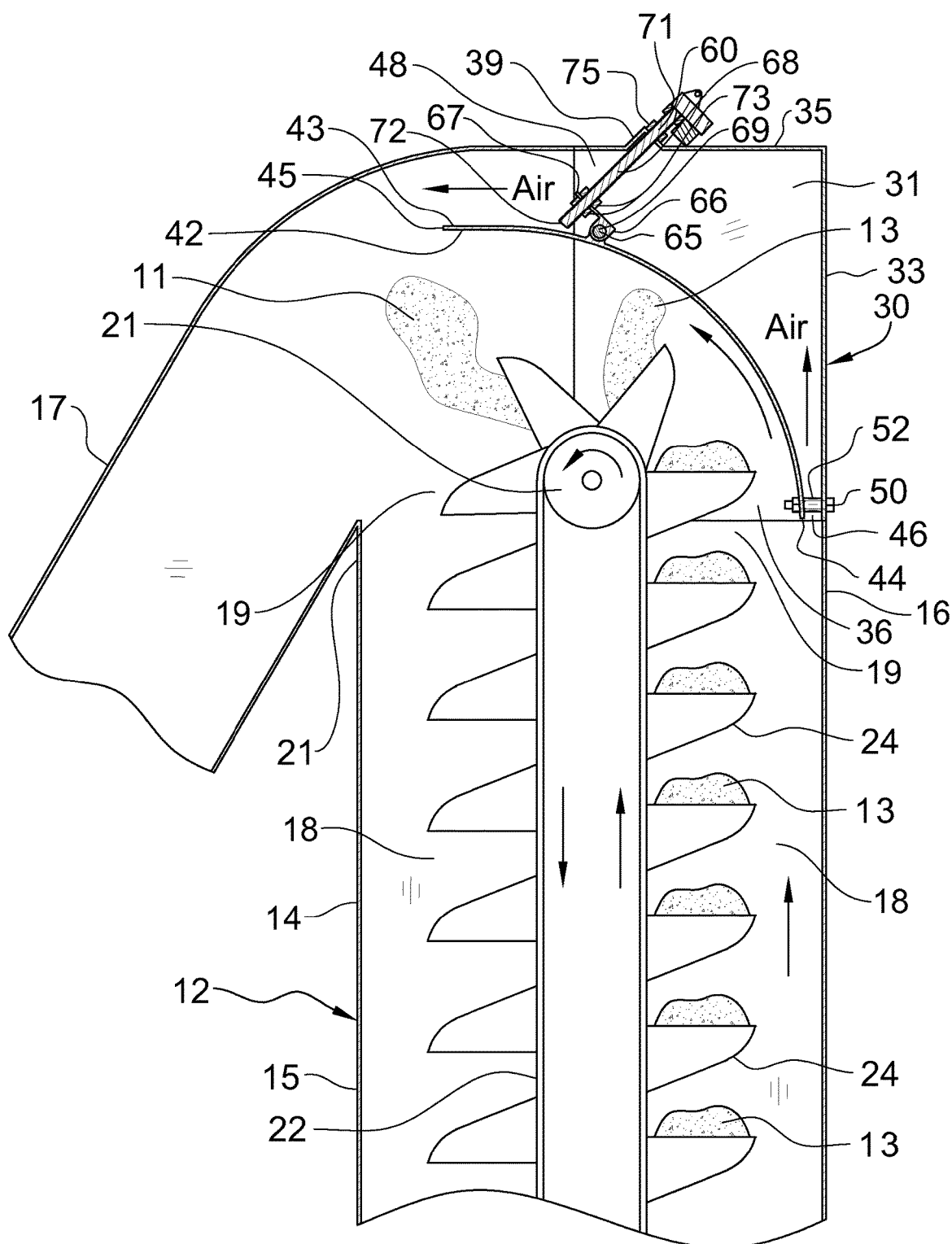
FIG. 10 is a side-cutaway view of a bucket elevator adjustable guide system in accordance with an example embodiment in conjunction with an operating bucket elevator.
Figure 11:
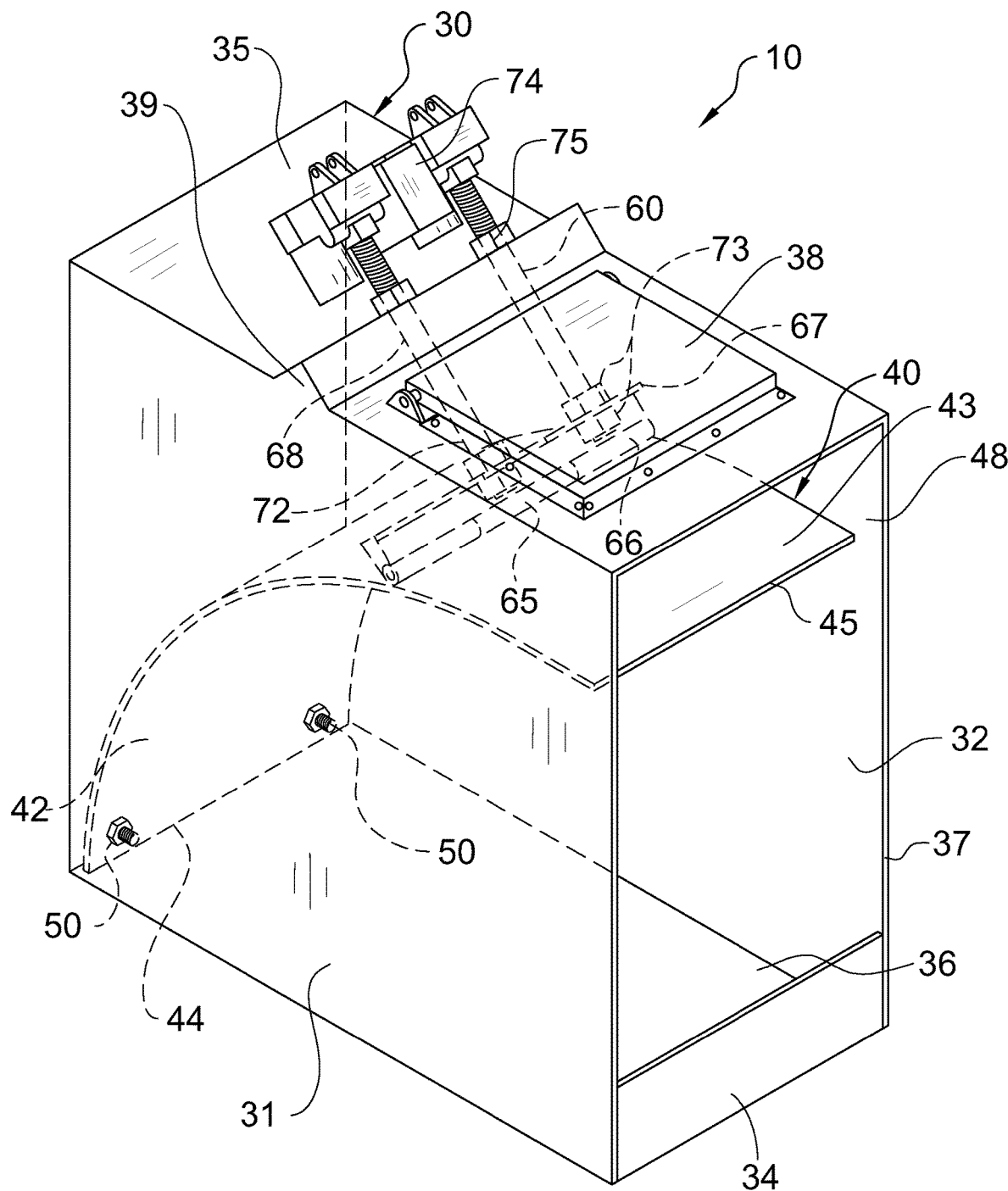
FIG. 11 is an upper perspective view of a bucket elevator adjustable guide system in accordance with another example embodiment.
Figure 12:
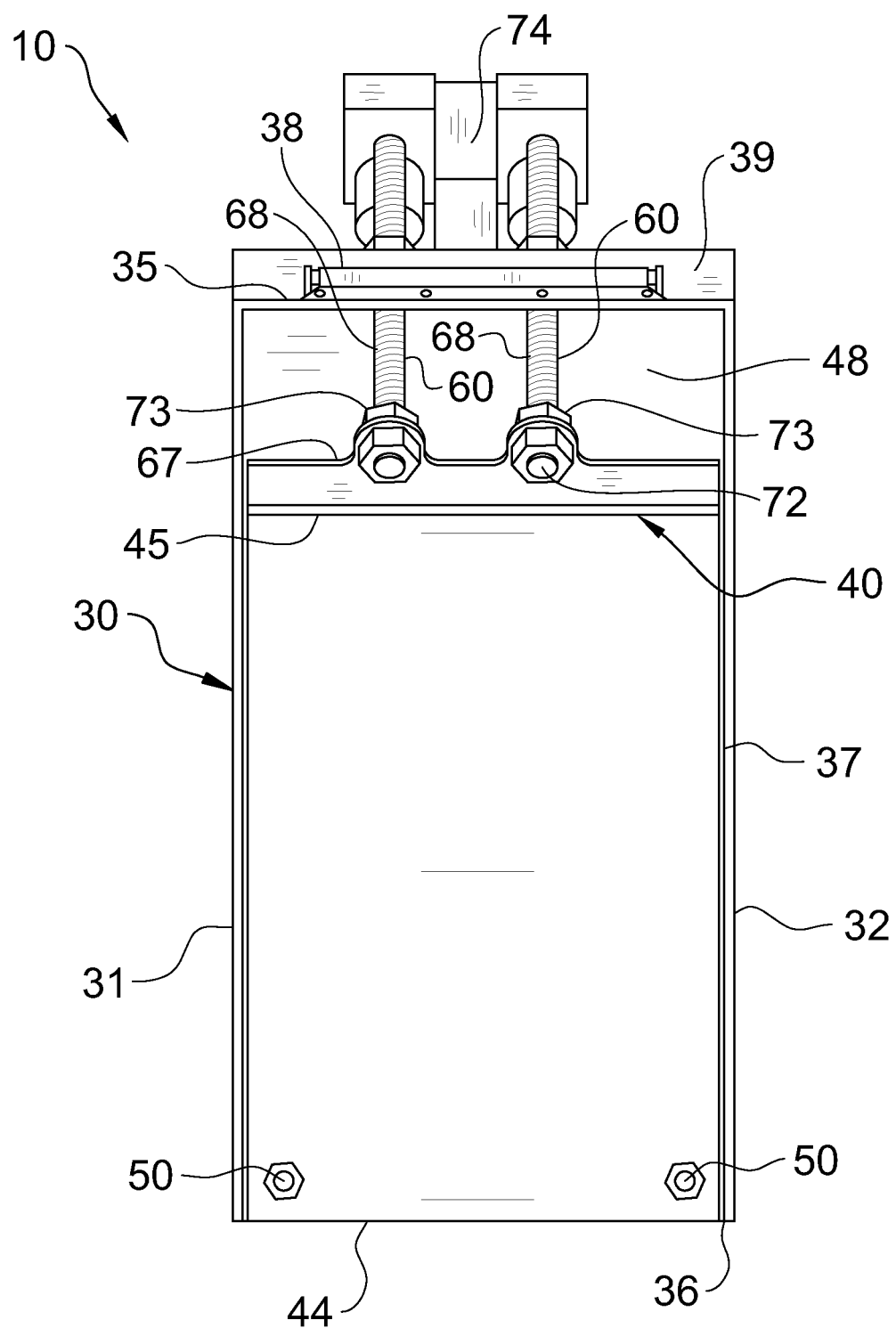
FIG. 12 is a front view of a bucket elevator adjustable guide system in accordance with another example embodiment.
Figure 13:
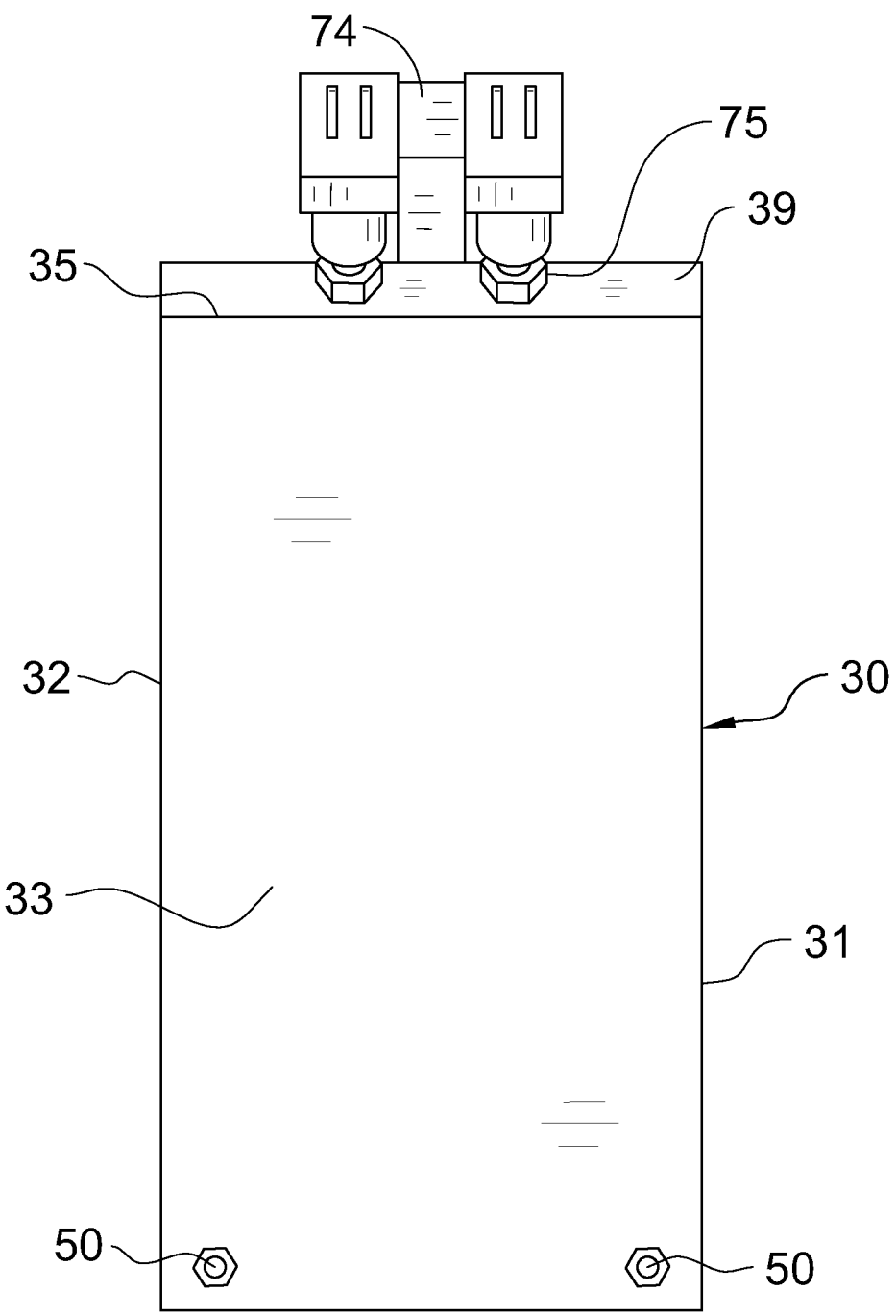
FIG. 13 is a rear view of a bucket elevator adjustable guide system in accordance with another example embodiment.
Figure 14:
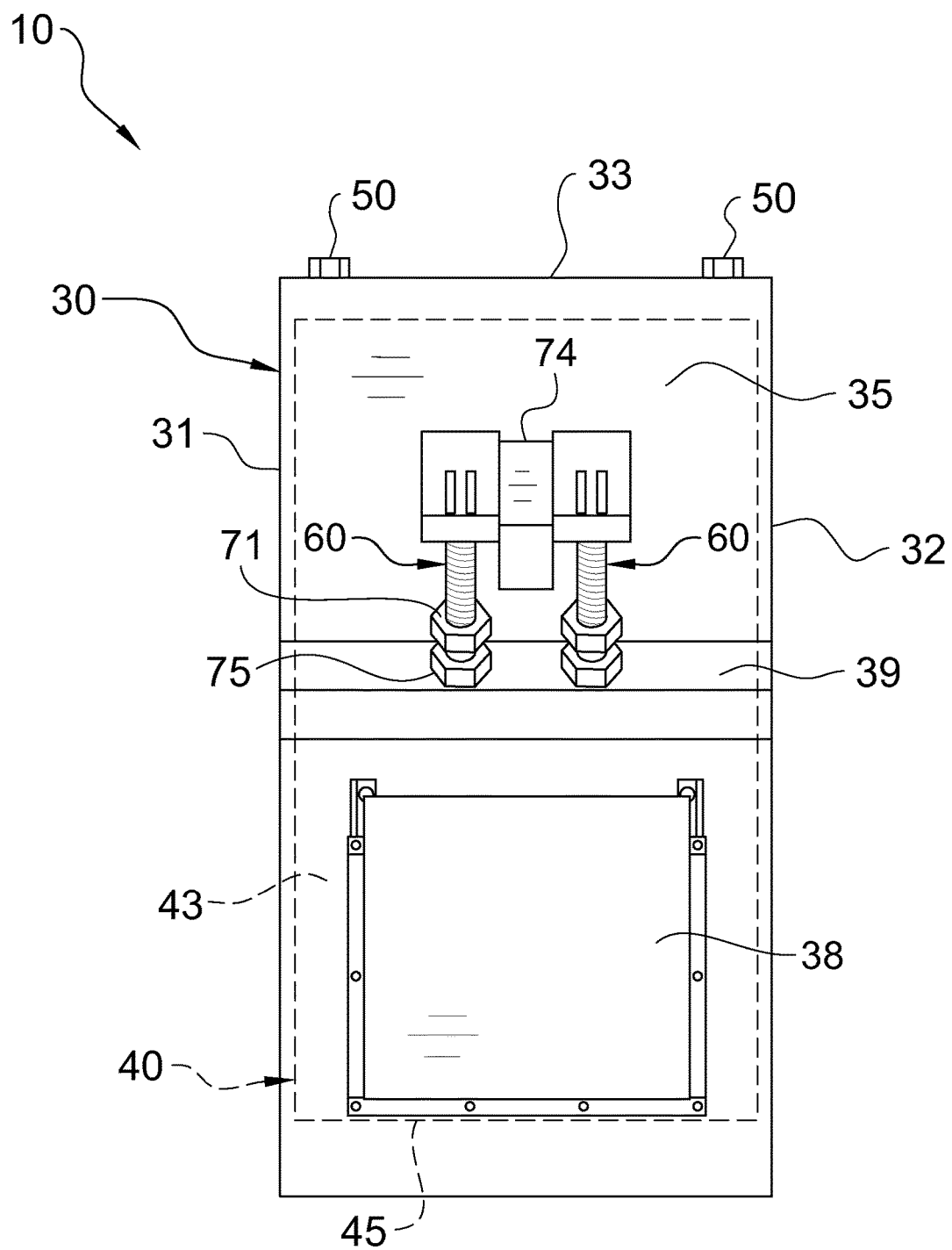
FIG. 14 is a top view of a bucket elevator adjustable guide system in accordance with another example embodiment.

The bucket conveyor 12 further comprises an upper pulley 21 located in the upper portion 16 of the enclosure or housing 14 within the head housing 30 and a lower pulley located in the lower portion 15 of the enclosure or housing 14 within the boot. An elongated flexible structure 22 (e.g., a belt or chain) extends between the upper pulley 21 and the lower pulley. The elongated flexible structure 22 preferably extends over and around the upper pulley 21 and the lower pulley in a substantially continuous loop. Either the upper pulley 21 or the lower pulley is rotatably driven by a drive, such as a motor 23, to cause the elongated flexible structure 22 to move in a substantially continuous loop around the pulleys. As illustrated in FIG. 10, this arrangement results in an upward moving run (illustrated by an upward arrow) from the lower portion 15 of the enclosure or housing 14 to the upper portion 15 and into the head housing 30, and a downward moving run (illustrated by a downward arrow) from the head housing 30 and upper portion 16 to the lower portion 15 and into the boot.

A plurality of buckets 24 are attached to the elongated flexible structure 22 and extend outwardly therefrom as further shown in FIG. 10. As each of the buckets 24 traverses the downward moving run into the boot and around the lower pulley, it picks up a load of the particulate material 13 present in the boot. Each of the buckets 24 with particulate material 13 then traverses the upward moving run, passing through the one or more upper openings 19 of the upper portion 16 of the enclosure or housing 14 and the one or more corresponding lower openings 36 of the head housing 30 into the head housing 30. As each of the buckets 24 gets to the top of the upward moving run and passes over the upper pulley 21, it rotates toward the discharge opening 37 of the head housing 30. The rotation generates a centrifugal force that causes the particulate material within the bucket 24 to be discharged from the bucket 24 generally in the direction of the discharge opening 37 as further shown in FIG. 10. The particulate material 13 that passes through the discharge opening 37 enters the discharge chute 17 for dispensing.

After, each bucket 24 passes over the upper pulley 21 and the particulate material 13 is discharged, the bucket 24 transitions to the downward moving run, passes through the one or more lower openings 36 of the head housing 30 and the one or more corresponding upper openings 19 of the upper portion 16 of the enclosure or housing 14 and returns to the boot in the lower portion 15 of the enclosure or housing 14 to pick up another load of the particulate material 13. As indicated above, the elongated flexible structure 22 and the buckets 24 may move along the upward moving and downward moving runs within one or more enclosed tubular legs of the bucket elevator 12 within the enclosure or housing 14.

C. Head Housing

Example embodiments of a head housing 30 for use with the bucket elevator 12 are illustrated in FIGS. 1-15. As described above, the head housing 30 (sometimes referred to as a "hood") is adapted to be connected to or to be formed as part of the upper portion 16 of the enclosure or housing 14. The head housing 30 is adapted to contain and prevent undesirable dispersion of the particulate material 13 and particles thereof as the particulate material is received from the bucket elevator 12 and discharged from the buckets 24 of the bucket elevator 12 into and through the discharge chute 17.

The head housing 30 comprises opposite first and second side walls 31, 32, a rear wall 33, optionally an at least partial front wall 34 opposite the rear wall 33, a ceiling 35, the one or more lower openings 36, and the discharge opening 37. The first and second side walls 31, 32, the rear wall 33, the front wall 34 if present, and the ceiling 35 form an at least partial enclosure around the one or more lower openings 36 and the discharge opening 37. The one or more lower openings 36 preferably are arranged to correspond with and to be in communication with the one or more openings 19 of the upper portion 16 of the enclosure or housing 14 to enable the buckets 24 to pass between the upper portion 16 of the enclosure or housing 14 of the bucket elevator 12 and the head housing 30 as described above. The one or more lower openings 36 may be connected to the upper ends of one or more corresponding tubular legs of the bucket elevator 12 if present. The discharge opening 37 is preferably in communication with the discharge chute 17 of the enclosure or housing 14 of the bucket elevator 12 for dispensing the particulate material 13 through the discharge chute 17. In the example embodiments, at least a portion of the discharge opening 37 is preferably at a higher elevation than the lower openings 36. The discharge chute 17 may be connected to the head housing 30 about the discharge opening 37 to receive the particulate material 13 discharged from the buckets 24 and to transfer the particulate material 13 to a different location such as another conveyor or a storage location. The at least partial front wall 34 if present may be positioned opposite of the rear wall 33 below the discharge opening 37.

In the example embodiments shown in FIGS. 1-15, the back or rear wall 33, the optional opposite front wall 34, and the opposite first and second side walls 31, 32 are each arranged to be substantially vertical. A substantially vertical edge of each of the first and second opposite side walls 31, 32 is connected with a corresponding opposite substantially vertical edge of the back or rear wall 33. Similarly, an opposite substantially vertical edge of each of the first and second opposite side walls 31, 32 is connected with corresponding opposite substantially vertical edges of the optional front wall 34 if present. The ceiling 35 extends substantially horizontally and perpendicularly with respect to the back or rear wall 33 from an upper substantially horizontal edge of the back or rear wall 33 over the first and second side walls 31, 32. Opposite substantially horizontal edges of the ceiling 35 are connected to substantially horizontal opposite upper edges of the first and second side walls 31, 32 thereby forming a substantially rectangular-shaped at least partial enclosure around the one or more lower openings 36 and the discharge opening 37.

One or more of the first and second side walls 31, 32 and the ceiling 35 may be fitted with one or more hatches 38 if desired. The hatches 38 enable access to the interior of the head housing 30 to enable repair or maintenance of components of the bucket elevator 12, clear jams, etc. If provided, the hatches 38 are preferably covered but selectively openable and closeable, for example with hinged covers.

It will be appreciated that each of the first and second side walls 31, 32, the back or rear wall 33, the optional front wall 34, and the ceiling 35 may be comprised of a single unitary structure such as a flat sheet of metal or other suitable material, or each may be comprised of multiple structures, such as multiple sheets of metal or another suitable material connected together by suitable means, such as fasteners, welding, or the like. It will also be appreciated that the first and second side walls 31, 32, the back or rear wall 33, the optional front wall 34, and the ceiling 35 may together be comprised of a single unitary structure suitably formed from sheet metal or another suitable material, or may be comprised of two or more separate structures such as separate flat metal sheets connected together by suitable means, such as fasteners, welding, or the like.

It will also be appreciated that while the example embodiment of the head housing 30 illustrated in FIGS. 1-15 is substantially rectangular in shape, the head housing 30 as well as one or more of its components may have different shapes, structures and configurations. For example, the back or rear wall 33 may be comprised of a curved configuration or an angled configuration. Similarly, one or more of the opposite first and second side walls 31, 32, the optional front wall 34, and/or the ceiling 35 may be rounded, angled, and/or inclined as desired or necessary.

D. Adjustable Guide Member

The guide member 40 is adapted to guide the particulate material 13 that is discharged from the buckets 24 toward the discharge opening 37 in order to increase the amount of the particulate material 13 that actually enters the discharge opening 37 and is dispensed through the discharge chute 17. The guide member 40 is also adapted to reduce undesirable dispersion of the particulate material 13 which can negatively impact the flow rate of the particulate material 13 to the discharge chute 17 and the overall efficiency of operation of the bucket elevator 12 as previously described herein.

The guide member 40 is preferably adjustable in position and in configuration to accommodate various types of conditions including, but not limited to, the type of particulate material 13 being transferred, the desired flow rate of the particulate material 13, temperature, possibly humidity, and any other conditions that may affect the operation of the bucket elevator 12. The guide member 40 is preferably attached or connected to the interior of the head housing 30 in a position within the interior of the head housing 30 to effectively guide the particulate material 13 being discharged from the buckets 24 toward the discharge opening 35 and into the discharge chute 17 as described above. This is best illustrated in FIGS. 1-2, 5, 8-10, and 15A-15B for example.

The guide member 40 is preferably attached or connected to the head housing 30 in an adjustable and movable manner that enables adjustment of the position and configuration of the guide member 40 upon demand to effectively accommodate various particulate materials 13 and conditions even while the bucket elevator 12 is operating as described further below. However, the guide member 40 also may be connected to the head housing 30 in a manner such that it is adjustable and movable only prior to the bucket elevator 12 being operated and is then locked or otherwise maintained in that position and configuration. For example, the guide member 40 can be attached or connected so that it can be set in a desired position and configuration at the factory or by an end user and then be locked or otherwise maintained in that position during subsequent operation of the bucket elevator 12.

The guide member 40 may be adjustably and movably connected or attached to the head housing 30 within the interior of the head housing 30 by being adjustably and movably connected or attached to one or more interior surfaces of the first and second side walls 31, 32, rear or back wall 33, and/or ceiling 35 at one or more points or locations. In the embodiment illustrated in FIGS. 1-10, for example, the guide member 40 is connected or attached to a rear or back wall 33 at two locations by fasteners 50 and to the ceiling 35 at one location by an adjustment member 60. In the embodiment illustrated in FIGS. 11-15, the guide member 40 is connected or attached to the rear or back wall 33 at the same two locations by fasteners 50 and to the ceiling 35 at two separate and different locations by adjustment member 60. Although not included in the example embodiments illustrated, it will be appreciate that the guide member 40 could also have additional or alternative connections or attachments to one or more of the first and second side walls 31, 32, rear or back wall 33, and/or ceiling 35 as dictated by the needs of particular applications. It will also be appreciated that one or more of the connections or attachments should be such as to enable the guide member 40 to be movable so that the position and configuration of the guide member 40 is adjustable.

The guide member 40 preferably is configured to have an interior surface 42 and an exterior surface 43 that is opposite the interior surface 42. As best illustrated in FIGS. 1-2, 5, 8-10, 11, and 15, at least a portion of the interior surface 42 preferably faces the interior of the head housing 30 and more specifically the upper portion of the bucket elevator 12 that extends into the head housing 12 at which the particulate material 13 is discharged from the buckets 24. At least a portion of the interior surface 42 is also adapted to be engaged by the discharged particulate material 13 and particles thereof and to guide them toward and into the discharge opening 37.

The guide member 40 is also preferably configured to have a lower end portion 44 and an upper end portion 45 opposite the lower end portion 44. The lower end portion 44 is preferably connected or attached to the lower portion of the head housing 30 (e.g., to the lower portion of the rear wall 33 or the sidewalls 31, 32) near the lower opening 36 in the head housing 30 through which the buckets 24 with particulate material 13 pass. The guide member 40 is preferably configured to extend substantially continuously and without interruption between the lower end portion 44 and the upper end portion 45. The upper end portion 45 is preferably attached or connected to the upper portion of the head housing 30 (e.g., to the ceiling 35 and/or the upper portions of the sidewalls 31, 32) near where the particulate material 13 is discharged from the buckets 24. In use with a substantially vertical bucket elevator 12 as shown and described herein, the guide member 40 is preferably configured so that the lower end portion 44 is substantially vertically orientated and the upper end portion 45 is substantially horizontally orientated in order for the interior surface 42 to engage the particulate material 13 discharged from the buckets 24 as they rotate from a vertical motion to a horizontal motion over the upper pulley 21 of the bucket elevator 12.

The guide member 40 also is preferably configured and dimensioned so that the upper end portion 45 extends laterally over the top of the bucket elevator 12 at least to and preferably through the discharge opening 37 of the head housing 30 and even partially into the discharge chute 17 of the bucket elevator 12 in order to maximize the amount of the particulate material 13 it guides toward and into the discharge opening 37 and discharge chute 17 while minimizing undesirable dispersion of the particulate material 13.

The guide member 40 may be comprised of one or more elongated substantially flat plates or sheets of suitable material such as, but not limited to, a flat plate or sheet of sheet metal. The guide member 40 is preferably configured to be substantially continuously curved in an arc that extends over the buckets 24 and through the discharge opening 37 as best illustrated in FIGS. 1-2, 5, 8-9, 15A-15B, and others. The radius of curvature of the arc may be constant or varying.

However, it will be appreciated that the exact shape, configuration, dimensions, and orientation of the guide member 40 between the lower end portion 44 and the upper end portion 45 will depend on the design of the bucket elevator 12 with which it is to be used, including the location and orientation at which the buckets 24 with particulate materials 13 enter the head housing 30 and the location and orientation of the discharge chute 17 relative to the head housing 30, the application for which the bucket elevator 12 is being used, and other considerations. Thus, for example, the lower end portion 44 may be oriented at an angle that is inclined from horizontal but substantially less than vertical and may approximately correspond to the angle at which buckets 24 with particulate material 13 enter the head housing 30. Similarly, the upper end portion 45 may be oriented at an angle that is inclined or declined from horizontal depending on the location and angle of the discharge chute 17 and the discharge opening 37 relative to the top of the bucket elevator 12. Still further, the guide member 40 may be configured not as a continuously curving structure, but as a structure with multiple linear sections with one or more differing angles. Still further, the guide member 40 may be configured to exhibit a curvature not only in the longitudinal direction between the lower end portion 44 and the upper end portion 45, but also in the lateral direction between opposite lateral sides of the guide member 40. In such a configuration, the guide member 40 may present a sort of partially enclosed chute with opposing partial side walls between the lower end portion 44 and the upper end portion 45. So long as the guide member 40 remains able to engage and guide at least a portion of the particulate matter 13 discharged from the buckets 24 toward the discharge opening 37 and the discharge chute 17 any and all of the foregoing and other variations are envisioned and intended to be encompassed.

The lower end portion 44 of the guide member 40 may be connected or attached to the interior surface of the rear or back wall 33 of the head housing 30 in a distally spaced manner to form a lower vent 46 between the exterior surface 43 of the guide member 40 and the interior surface of the head housing 30. Similarly, the upper end portion 45 of the guide member 40 may be connected or attached to the interior surface of the ceiling 35 of the head housing 30 in a distally spaced manner to form an upper vent 48 between the exterior surface 43 of the guide member 40 and the interior surface of the head housing 30. The lower vent 46 and the upper vent 48 are in fluid communication with one another to enable air to pass between them through the space between the exterior surface 43 of the guide member 40 and the interior surfaces of the head housing 30. As best illustrated in FIG. 10, the lower vent 46 receives air moving upwardly with the upward moving run of the bucket elevator 12 represented by the upward arrow labeled "Air." The air flows from the lower vent 46 between the exterior surface 43 of the guide member 40 and the interior surfaces of the head housing 30 and then out through the upper vent 48 represented by the horizontal arrow labeled "Air." The flow of air from the upper vent 48 further helps to guide the particulate material 13 ejected from the buckets 24 into the discharge tube, to prevent undesirable dispersion of the particulate material 13 and particles thereof, and to reduce turbulence in the flow thereof.

In the example embodiments, and as best illustrated in FIGS. 1-5, 7-10, 15A-15B and others, the lower end portion 44 of the guide member 40 is preferably connected or attached to the lower portion of the rear or back wall 33 of the head housing 30 by one or more fasteners 50, each of which extends from the rear or back wall 33 to the lower end portion 44. As shown, it is preferable to utilize at least two such fasteners 50 positioned near opposite lateral sides of the guide member 40. Each of the fasteners 50 is preferably adjustable to enable the spacing between exterior surface of the guide member 40 and the interior surface of the rear or back wall 33 of the head housing 30 to be adjusted to accommodate different applications and conditions. For example, each fastener 50 may comprise a threaded shaft (e.g., a threaded bolt with a threaded nut attached to the bolt), but a non-threaded shaft may also be utilized (e.g., a welded shaft connecting the lower end portion 44 of the guide member 40 to the rear wall 33 of the head housing 30). A spacer 52 having thickness corresponding to the desired spacing is positioned upon the shaft of the fastener 50, preferably between the interior surface of the rear wall 33 of the head housing 30 and the exterior surface 43 of the guide member 40. The thickness of the spacer 52 defines and maintains the desired spacing for the lower vent 46. The spacer 52 may be removed and replaced with a spacer of a different size and thickness depending upon the size of the lower vent 46 desired for particular bucket elevator 12 designs and applications.

E. Remotely Controllable Adjustment Member

As described above, the guide member 40 is preferably connected or attached to the interior surface of the ceiling 35 of the head housing 30 by the adjustment member 60. The adjustment member 60 is adapted and operable to move at least a portion of the guide member 40 to adjust the position and configuration of the guide member 40 within the interior of the head housing 30 with respect to the head housing 30 and the bucket elevator 12. More specifically, the adjustment member 60 is preferably adapted and operable to adjust the position and configuration of the guide member 40 to provide a desired or optimized flow rate of particulate material 13, to optimize the operating efficiency of the bucket elevator 12, to accommodate different types of particulate material 13, to accommodate for different operating conditions such as temperature and humidity, and to account for any other factors affecting operation of the bucket elevator 12.

The adjustment member 60 is adapted and configured to receive communications remotely from and to be controlled and operated remotely by the control system 80 as described further below. The adjustment member 60 is adapted and configured to be remotely controlled and operated by the control system 80 either manually at any time on demand by an operator, automatically, or both to remotely adjust the position and configuration of the guide member 40 any time on demand or automatically. This enables the position and configuration of the guide member 40 to be selectively manually adjusted or automatically adjusted in real-time even while the bucket elevator 12 is operating and without the need for an operator to physically access the adjustment member 60. This is beneficial since the adjustment member 60 may be and often will be positioned with respect to the head housing 30 and the bucket elevator 12 in difficult to access and potentially dangerous locations. For example, the bucket elevator 12 may be quite tall and steep rendering access to the adjustment member 60 both difficult and potentially dangerous. It is also beneficial because it enables the adjustment member 60 to be manually selectively controlled and operated or automatically controlled and operated to adjust the position and configuration of the guide member 40 safely even while the bucket elevator 12 is operating. Adjustments thus may be made to the position and configuration of the guide member 40 affecting the operation of the bucket elevator 12 on demand and on the fly, for example in response to an operator observing the operation of the bucket elevator 12, or automatically in real-time in order to optimize or otherwise alter the operation.

As just two possible examples illustrated in FIGS. 8-9 and 15A-15B, the adjustment member 60 may be controlled to move at least a portion of the guide member 40 to adjust or reposition the guide member 40 between a first position 62 and a second position 64 and to adjust the configuration of the guide member 40 between a first configuration and a second configuration. In the first position 62, for example, the guide member 40 may be configured with the lower end portion 44 substantially vertical and spaced at a first distance from the interior surface of the rear wall 33 of the head housing 30 thus creating a lower vent 46 of a first size. The upper end portion 45 may be spaced a first distance from the interior surface of the ceiling 35 of the head housing 30, thus creating an upper vent 48 of a first size, may be spaced a first distance from the buckets 24 at the top of the bucket elevator 12, and may be oriented at a slight incline from horizontal. In addition, the guide member 40 may be configured to have a first radius and profile of curvature between the lower end portion 44 and the upper end portion 45. For example, the radius of curvature may be relatively large and the profile may be substantially constant.

In contrast, in the second position 64, for example, the guide member 40 may be configured with the lower end portion 44 angled or inclined away from the interior surface of the rear wall 33 of the head housing 30 and spaced at a second greater distance therefrom, thus creating a lower vent 46 of a second greater size. The upper end portion 45 may be spaced a second greater distance from the interior surface of the ceiling 35 of the head housing 30, thus creating an upper vent 48 of a second greater size, may be spaced a second smaller distance from the buckets 24 at the top of the bucket elevator 12, and may be oriented substantially horizontal. In addition, the guide member 40 may be configured to have a second different radius and profile of curvature between the lower end portion 44 and the upper end portion 45. For example, the radius of curvature may have a profile that varies between the lower end portion 44 and the upper end portion 45 with the radius being relatively smaller at and near the lower end portion 44 and increasing and becoming relatively larger at and near the upper end portion 45.

It will thus be appreciated that generally the adjustment member 60 can be controlled to adjust the position and configuration of the guide member 40 to adjust the distance between the guide member 40 and the buckets 24 of the bucket elevator 12 from which the particulate material 13 is discharged. The adjustment member 60 also can be controlled to adjust the position and configuration of the guide member 40 to adjust the size of the lower and upper vents 46, 48 and hence the air flow through the vents, the angles of the lower and upper end portions 44, 45 of the guide member 40 relative to the direction in which the particulate material 13 is discharged from the buckets 24, and the relative angle and vertical distance between the upper end portion 45 of the guide member 40 and the discharge opening 37 and discharge chute 17.

While only two example positions and configurations are illustrated, that is merely to facilitate description and it will be appreciated that numerous other positions and configurations are also possible. In fact, it should be appreciated that an almost unlimited number of positions and configurations of the guide member 40 can be achieved within the limits of motion and resolution of the adjustment member 60 and the limits of motion and flexibility of the guide member 40.

Turning to further details of example embodiments of the adjustment member 60, FIGS. 1-10 illustrate a first example embodiment and FIGS. 11-15 illustrate a second example embodiment. In both example embodiments, the adjustment member 60 is connected to and between the head housing 30 and a portion of the guide member 40. In the example embodiments, the adjustment member 60 is connected or attached to the guide member 40 nearer to the upper end portion 45 than the lower end portion 44. The adjustment member 60 is preferably pivotally connected or attached to the guide member 40 by one or more pivotable connections 65, such as hinges, to allow the guide member 40 to pivot or rotate relative to the direction of movement of the adjustment member 60 to prevent binding when adjusting the position of the guide member 40. The one or more pivotable connections 65 preferably extend laterally across substantially the entire width of the guide member 40.

The pivotable connection 65 is preferably comprised of a first member 66 that is pivotably coupled to the exterior surface 43 of the guide member 40 and a second member 67 that is fixedly coupled to a shaft 68 of the adjustment member 60 as described further below. The first member 66 preferably extends upwardly and rearwardly at an acute angle from the exterior surface 43 of the guide member 40 at a location proximate the upper end portion 45 of the guide member 40. Preferably, the first member extends laterally across substantially the entire width of the guide member 40 at that location. The first member 66 is preferably pivotally connected to the guide member 40 via one or more elongated pins 69 or other pivoting structures. Accordingly, the pivot axis or axis of rotation of the first member 66 around the pin 69 preferably extends laterally with respect to the guide member 40 and is substantially parallel and tangential with the external surface 43 thereof. As described further below, the pivot axis or axis of rotation around the pin 69 is also preferably substantially orthogonal to the axis of rotation of the shaft 68 of the adjustment member 60.

The second member 67 is preferably fixedly connected, attached or formed with the first member 66. The second member 67 preferably extends outwardly at an angle from the first member 66 and more preferably extends upwardly and forwardly at an acute angle from an upper end of the first member 66 as best seen in FIGS. 5 and 8-10. Preferably, the second member 67 is laterally coextensive with the first member 66 and thus preferably extends substantially across the entire width of the guide member 40.

The adjustment member 60 preferably comprises an elongated linear threaded shaft 68 having a proximal end portion 71 and a distal end portion 72. The adjustment member 60 is preferably rotatably connected or attached to the second member 67 of the pivotable connection 65. More specifically, the distal end portion 72 of the shaft 68 of the adjustment member 60 is rotatably connected or attached to the second member 67. The adjustment member 60 is thereby rotatably connected or attached to the guide member 40 along a first axis of rotation that coincides with the longitudinal axis of the shaft 68 and is pivotably connected or attached to the guide member 40 along a second axis that coincides with the longitudinal axis of the pin 69 and that is substantially orthogonal to the first axis.

In the first example embodiment, the adjustment member 60 comprises a single shaft 68 and is connected or attached to the second member 67 and hence the guide member 40 at a single location preferably about midway across the width of the guide member 40. In the second example embodiment, the adjustment member 60 comprises two laterally spaced substantially parallel shafts 68 and is connected or attached to the second member 67 at two laterally spaced apart locations along the width of the guide member 40. Preferably, the two locations are substantially symmetrically arranged and substantially equally spaced from opposite lateral edges of the guide member 40. It will be appreciated that other shaft and connection arrangements are also possible and contemplated. For example, the adjustment member 60 may comprise more than two shafts and may be connected or attached to the second member 67 and hence the guide member 40 at more than two locations. Further, the shafts 68 and their connection locations with the guide member 40 may be arranged to be laterally and/or longitudinally spaced in relation to each other and in relation to the guide member 40 if desired.

The distal end portion 72 of each shaft 68 of the adjustment member 60 preferably extends through and is rotatable within an aperture of the second member 67 thereby allowing for rotation of the adjustment member 60 by a user relative to the second member 67 and hence relative to the guide member 40. A retaining member 73 preferably retains the distal end portion 72 of each shaft 68 in rotatable connection with the second member 67 at the connection location. For example, a pair of internally threaded retaining nuts may be fixedly connected with the second member 67 and positioned on opposing sides of each aperture of the second member 67 at each connection location. The internal threads of the retaining nuts may engage with the exterior threads on the distal end portion 72 of each shaft 68 of the adjustment member 60 extending through the apertures and thereby retain the adjustment member 60 in rotatable engagement with the second member 67, thus allowing for rotation of the adjustment member 60 relative to the second member 67 and hence the guide member 40.

The shaft 68 of each adjustment member 60 is preferably arranged with at least the proximal end portion 71 thereof extending outside of the head housing 30 and being accessible for engagement by one or more drive units 74 which are described further below. Further, the shaft 68 of each adjustment member 60 is preferably rotatable about its longitudinal axis relative to the head housing 30. For this purpose, the shaft 68 may have external threads and the head housing 30 may have an internally threaded aperture or opening through which the shaft 68 extends. The engagement of the external threads of the shaft 68 and the internal threads of the opening threadedly and rotatably connect the shaft 68 and hence the adjustment member 60 and the head housing 30.

Alternatively, an internally threaded connection member 75 may be fixedly connected or attached to the head housing 30 at the aperture or opening (e.g., a threaded nut fixedly connected to the head housing 30). The threaded shaft 68 of the adjustment member 60 extends through the threaded connection member 75 and the aperture or opening in threaded and rotatable engagement therewith. The proximal end portion 71 of the shaft 68 may also comprise an engagement structure, such as a hexagonal-shaped head or recessed socket. The engagement structure is preferably adapted to be engaged by a drive unit 74 to rotate the shaft 68 and hence the adjustment member 60 relative to the head housing 30 and the second member 67 of the pivotable connection 65 of the guide member 40 to thereby selectively move the guide member 40 to adjust its position and configuration as described herein.

A drive unit 74 is coupled to the proximal end portion 71 of the shaft 68 of the adjustment member 60. The drive unit 74 is adapted to selectively rotatably drive the shaft 68 and hence the adjustment member 60 relative to the head housing 30 and the second member 67 of the pivotable connection 65 of the guide member 40 to selectively move the guide member 40 to adjust its position and configuration as described herein.

Figure 8:
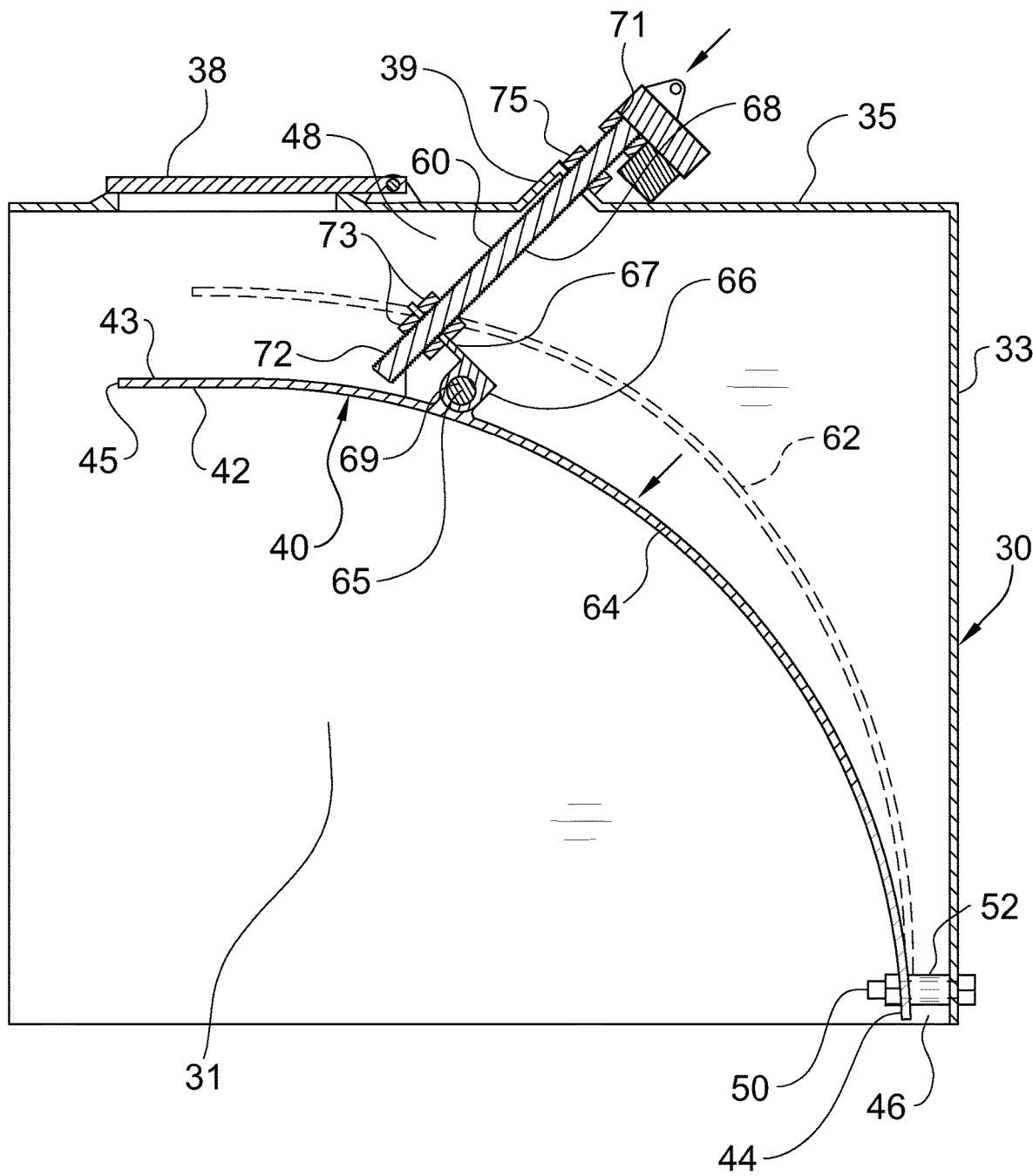
FIG. 8 is a cross-sectional side view of a bucket elevator adjustable guide system in accordance with an example embodiment taken along line 8-8 of FIG. 4 illustrating an adjustable guide being moved from a first position to a second position.
Figure 9:
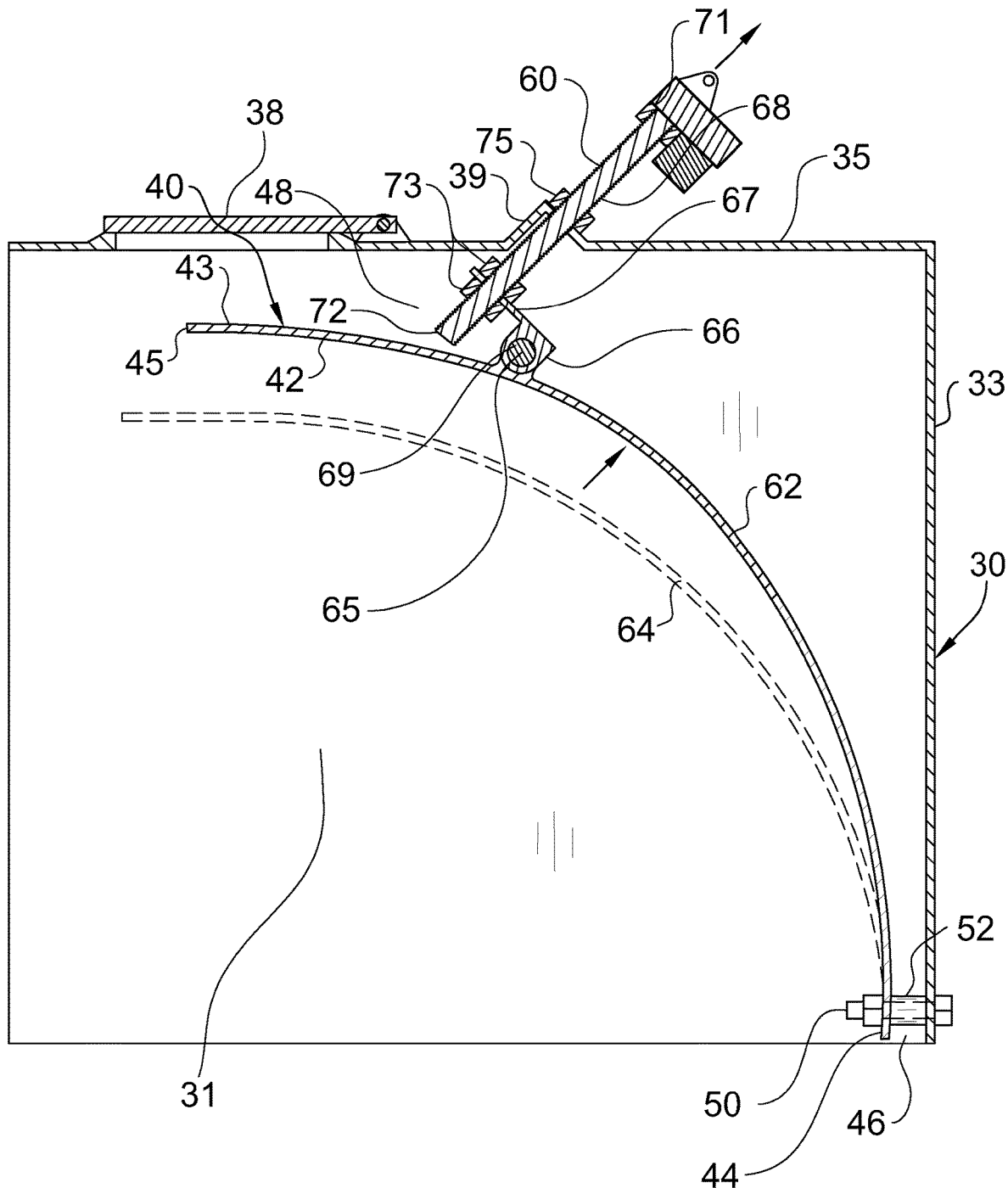
FIG. 9 is a cross-sectional side view of a bucket elevator adjustable guide system in accordance with an example embodiment taken along line 8-8 of FIG. 4 illustrating an adjustable guide being moved from another first position to another second position.
Figure 15A:
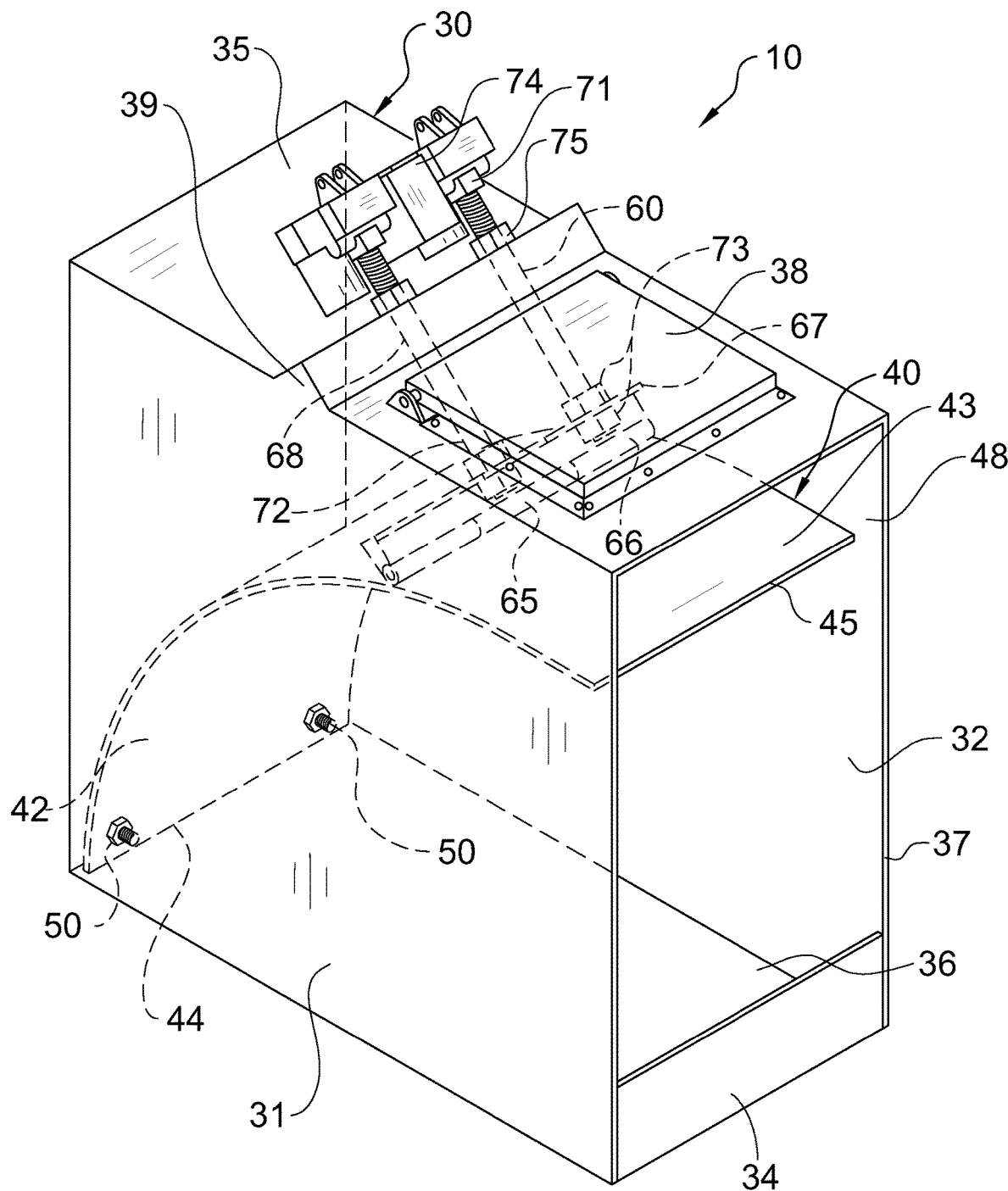
FIG. 15A is a perspective view partially in cross-section of a bucket elevator adjustable guide system in accordance with another example embodiment illustrating an adjustable guide moved in a first position.
Figure 15B:
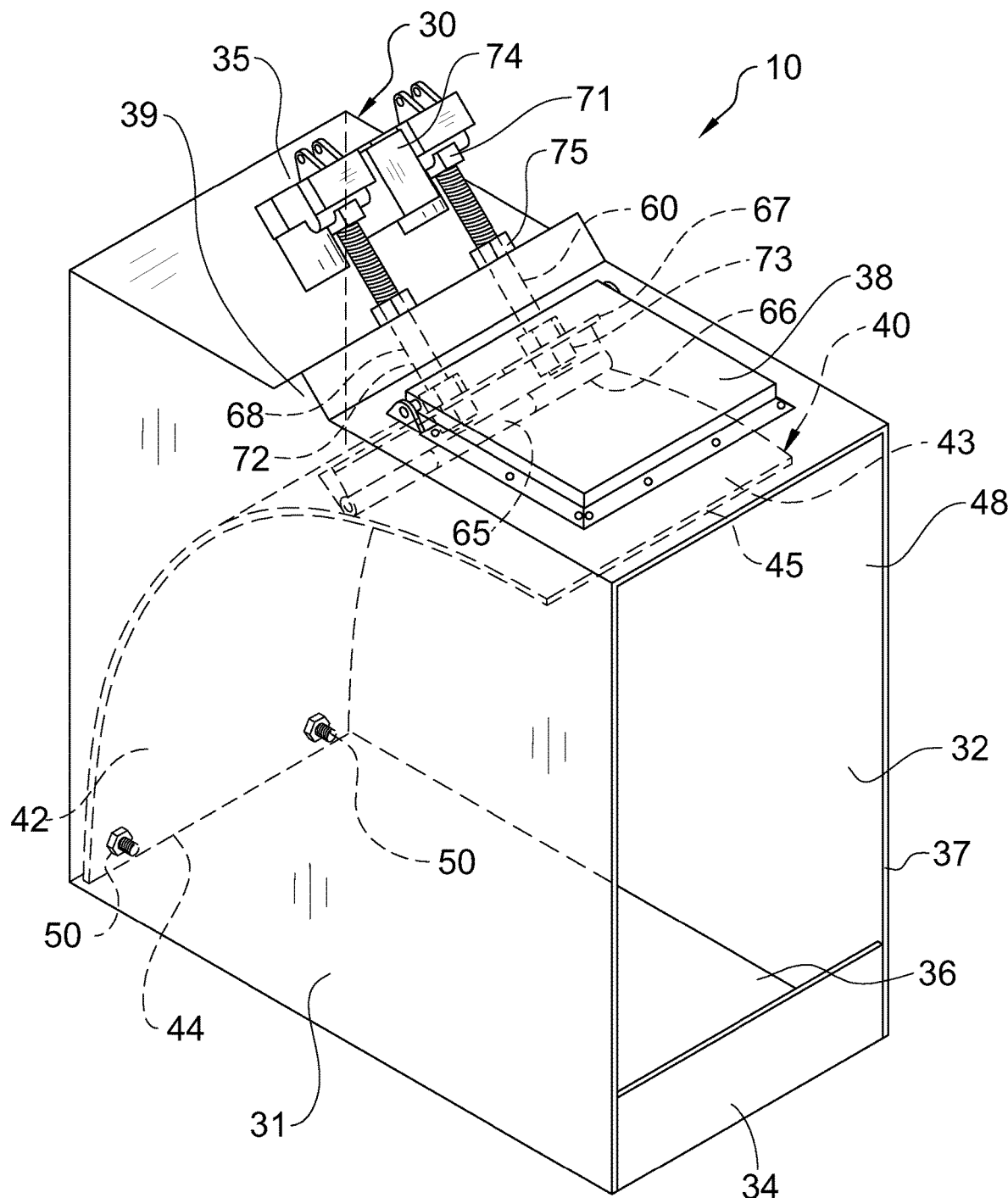
FIG. 15B is a perspective view partially in cross-section of a bucket elevator adjustable guide system in accordance with another example embodiment illustrating an adjustable guide moved in a second position.

When the drive unit 74 selectively rotates the adjustment member 60 in a first direction (e.g., clockwise), the shaft 68 of the adjustment member 60 extends or further extends in and into the interior of the head housing 30 thereby pushing the upper end portion 45 of the guide member 40 downwardly and inwardly at an angle as previously described and as shown in FIGS. 8 and 15A. When the drive unit 74 selectively rotates the adjustment member 60 in a second direction opposite of the first direction (e.g., counterclockwise), the shaft 68 of the adjustment member 60 retracts or further retracts in and from the interior of the head housing 30 thereby pulling the guide member 40 upwardly and outwardly at an angle also as previously described and as shown in FIGS. 9 and 15B.

As the shaft 68 of the adjustment member 70 extends and retracts in the interior of the head housing 30 to move the guide member 40, the pivotable connection 65 pivots relative to the adjustment member 60 and the guide member 40 to prevent binding of the adjustment member 60 with respect to the guide member 40. It should be noted that the movement of the guide member 40 between the lower end portion 44 and the upper end portion 45 is neither solely horizontal nor solely vertical since the lower end portion 44 is fixedly connected or attached to the lower portion of the rear wall 33 of the head housing 30 while the upper end portion 45 is pivotably or rotatably movable relative and adjacent to the ceiling 35 with extension and retraction of the adjustment member 60. Instead, this arrangement results in the guide member 40 being substantially continuously movable over a relatively broad arc-shaped path having a relatively large radius and being capable of adjustment to a substantially continuous plurality of different positions and configurations along the path.

The shaft 68 of the adjustment member 60 preferably is arranged to extend downwardly into the interior of the head housing 30 through the ceiling 35 at an angle extending away from the rear wall 33 and toward the discharge opening 37 as best seen in FIGS. 1, 5, 8-10, 11, and 15A-15B. The angle of the shaft 68 is preferably approximately aligned with the desired arc of movement of the guide member 40 as best seen in FIGS. 8-10 and 15A-15B. The ceiling 35 of the head housing 30 preferably includes an outward extension or protrusion 39 that extends upwardly and outwardly from the ceiling 35. The extension or protrusion 39 preferably has a forward facing wall and a rear facing wall. The aperture or opening of the head housing 30 through which the shaft 68 of the adjustment member 60 extends is formed in the rear facing wall. Accordingly, the shaft 68 of the adjustment member 60 extends through the rear facing wall substantially transverse to the rear facing wall and the angle at which the rear facing wall extends from the ceiling 35 thus defines the substantially transverse and preferably perpendicular angle at which the shaft 68 extends into the interior of the head housing 30 as best seen in FIGS. 1, 5, 8-10, 11, and 15A-15B.

In the first embodiment illustrated in FIGS. 1-10, a single drive unit 74 is coupled to a single shaft 68 of the adjustment member 60 and the single drive unit 74 selectively rotatably drives the shaft 68 to move the adjustment member 60 and hence the guide member 40 at a single connection point. In the second embodiment illustrated in FIGS. 11-15 a single drive unit 74 is coupled to two laterally spaced parallel shafts 68 of the adjustment member 60 and selectively rotatably drives both shafts 68 in common to move the adjustment member 60 and hence the guide member 40 at two connection points. It will be appreciated that in the latter embodiment it will be preferable in most instances for the drive unit 74 to be arranged to drive the two shafts 68 at substantially the same rate to move portions of the guide member 40 near the connection points substantially the same distance in the same direction. However, that is not necessarily always the case, and it is contemplated that there may be instances in which it is desired for the drive unit 74 to be arranged to drive the two shafts 68 at different rates and to move different portions of the guide member 40 near different connection points different distances and at least somewhat different directions. It is also contemplated that a separate drive unit 74 may be coupled to each shaft 68 and each drive unit 74 may be arranged to drive the shaft 68 to which it is coupled independently of the other drive unit 74 and shaft 68 to selectively and independently move different portions of the guide member 40 near the connection points different distances and at least somewhat different directions.

Each drive unit 74 may comprise a suitable electric motor such as, but not limited to, a brushed or brushless DC motor, an AC motor, a servo motor, or a discrete stepper motor. The rotor of each drive motor may be directly or indirectly rotationally coupled to the proximal end portion 71 of a shaft 68 of the adjustment member 60 by a direct coupling, or one or more chains, belts, or gears. For example, the rotor may have a hexagonal-shaped coupling that directly engages with a corresponding hexagonal-shaped head or recessed socket on the proximal end portion 71 of the shaft 68. Alternatively, the rotor of the drive motor may itself constitute the shaft 68. Also alternatively, the drive unit 74 may comprise another type of mechanical, electro-mechanical, hydraulic, or pneumatic actuator in place of or in addition to a motor. Such an actuator may comprise a linear actuator, such as a solenoid, and/or may comprise gears or other mechanisms to produce and apply rotational or linear force to drive the shaft 68.

Both example embodiments of the adjustment member 60 are preferably remotely controllable at any time either manually on demand, automatically in real-time, or both and without the need for an operator to physically access the adjustment member 60. Accordingly, each drive unit 74 is adapted for its operation to be remotely controlled in the same manner without the need for the operator to physically access the drive unit 74.

F. Control System

Figure 16:
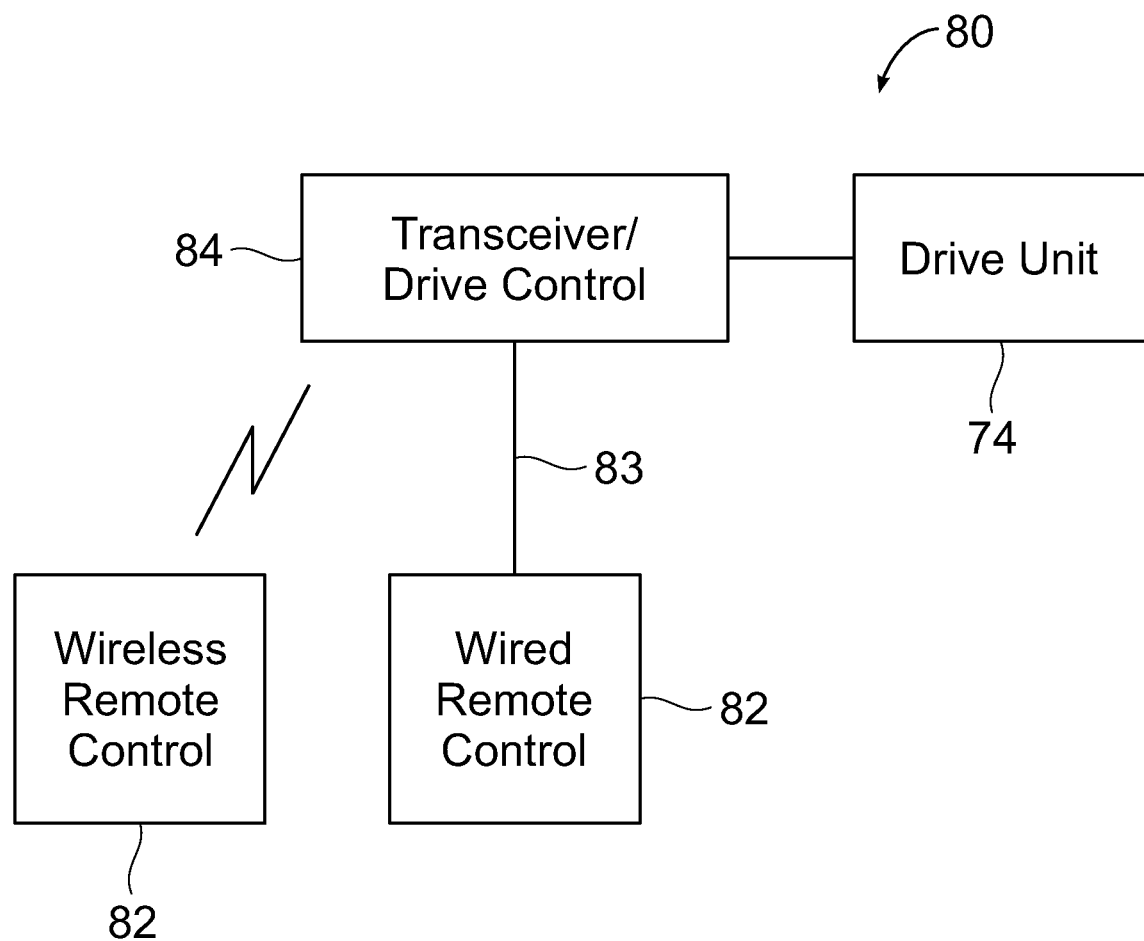
FIG. 16 is a functional block diagram of an example control system for a remotely controllable adjustment member of a bucket elevator adjustable guide system in accordance with the example embodiments.
Figure 17:
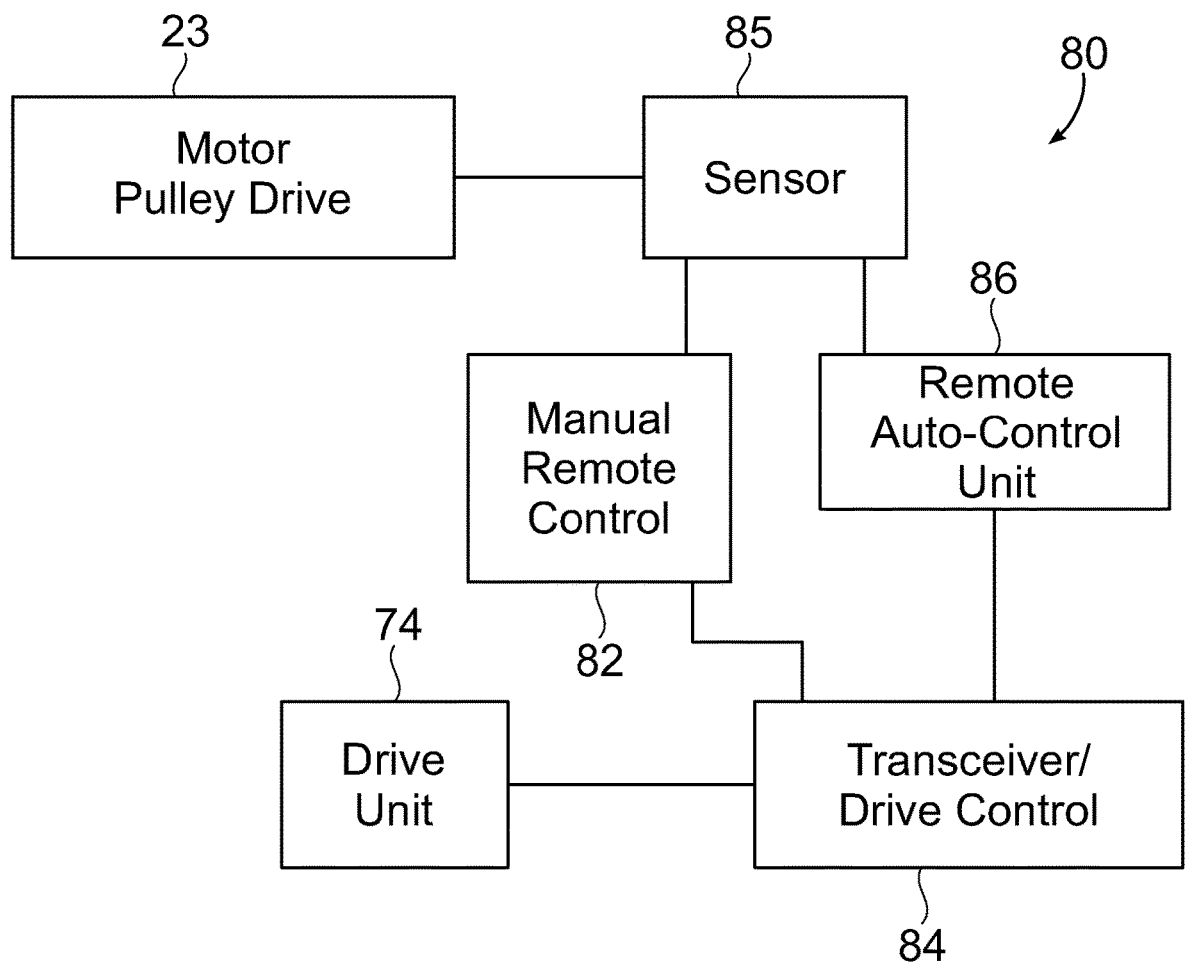
FIG. 17 is a functional block diagram of another example control system for a remotely controllable adjustment member of a bucket elevator adjustable guide system in accordance with the example embodiments.
Figure 18:
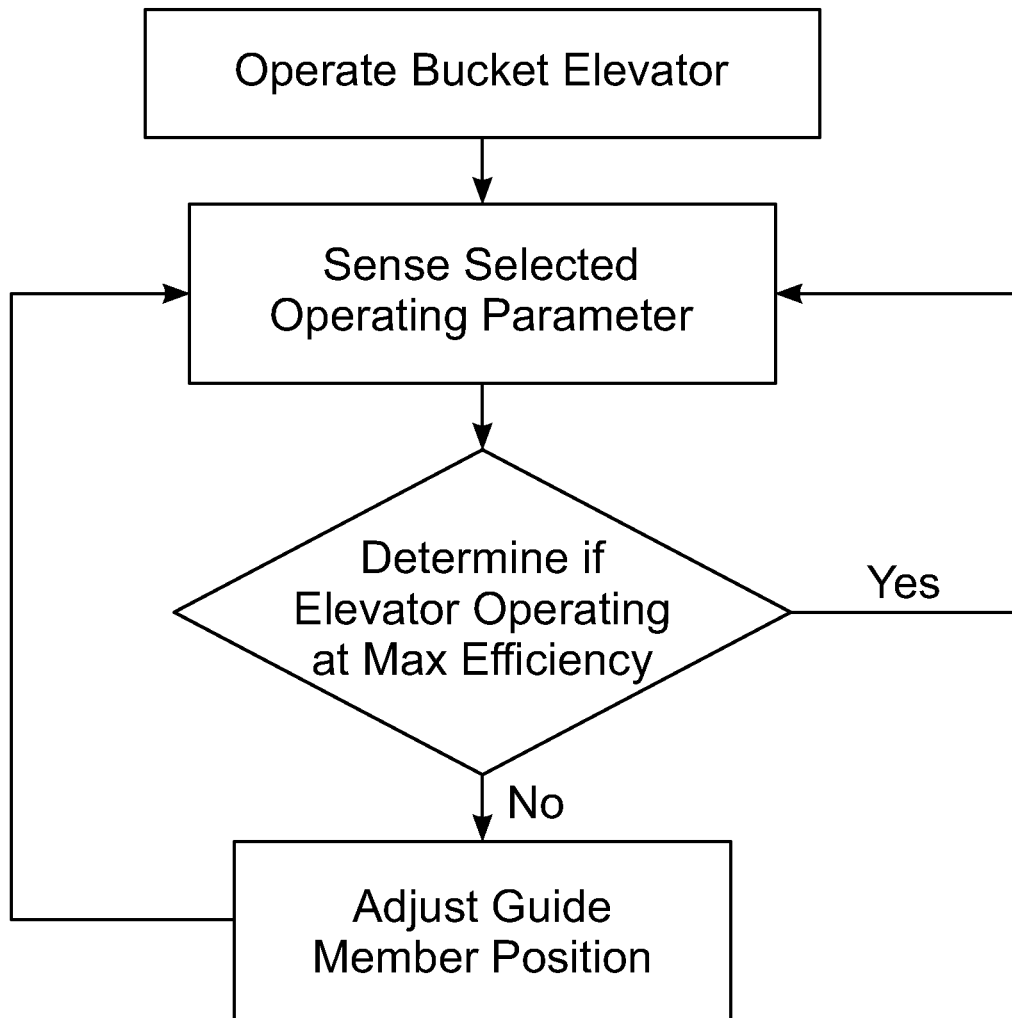
FIG. 18 is a flow diagram illustrating the basic operation of the example control system shown in FIG. 17 for a remotely controllable adjustment member of a bucket elevator adjustable guide system in accordance with the example embodiments.

FIGS. 16-18 illustrate example embodiments and operation of a control system 80 for remotely communicating with and controlling the operation of the example embodiments of the adjustment members 60 including each drive unit 74. In one example embodiment illustrated in FIG. 16, the control system 80 preferably comprises a wireless or wired remote control 82 and a transceiver/drive control unit 84. The transceiver/drive control unit 84 is preferably electrically coupled with one or more drive units 74. The transceiver/drive control unit 84 may be physically mounted on or otherwise connected or attached to a drive unit 74, or may be physically separate from the drive unit 74 and electrically coupled thereto wirelessly, or by suitable electrical wiring and connections.

The transceiver/drive control unit 84 is also preferably electrically coupled with a wired remote control 82 via a suitable wired connection 83 and/or wirelessly coupled with a wireless remote control 82 via a suitable wireless connection. The wired connection 83 may comprise suitable electrical wiring and connections. The wireless connection may comprise a suitable wireless communication link and protocol. For example, the transceiver/drive control 84 may communicate with the wireless remote control 82 via a suitable RF, optical, or other wireless link, and any suitable wireless data transmission protocol may be employed, including those described in the sections below.

Preferably, the transceiver/drive control 84 is adapted and configured to receive commands or instructions from the wired and/or wireless remote control 82, to control the operation of the drive unit 74 in response to the commands or instructions, and optionally to communicate operational and/or status data back to the remote control 82. For example, the commands or instructions preferably will include one or more of the following: apply or remove power to the drive unit 74, control the drive unit 74 to rotate the adjustment member 60 in a first direction, control the drive unit 74 to rotate the adjustment member 60 in a second direction opposite the first direction, and control the drive unit 74 to stop rotating the adjustment member 60. It will be appreciated that depending on the level of intelligence of the drive unit 74, additional commands may be possible, such as to rotate at a specific rate, rotate a specified number of revolutions, or rotate to extend the shaft 68 of the adjustment member 60 by a specified distance. Optionally, and again depending on the intelligence of the transceiver/drive control 84, the transceiver/drive control 84 may also be adapted and configured to communicate operational and/or status information back to the remote control 82. Such information may include for example: confirmation that a command has been received and is being acted on, rotational position information, rate of rotation, number of revolutions rotated, direction of rotation, distance the adjustment member 60 moved, distance the guide member 40 moved, etc. Similarly depending on the intelligence of the remote control 82, some of the foregoing information may be derived by the remote control 82 from information provided by the transceiver drive/control 84.

The wireless remote control 82 may comprise a stationary or a mobile device, such as one of those described in the sections below, and may be located anywhere a communication link with the transceiver/drive control 84 can be established and maintained. For example, an operator could walk around or near the bucket elevator 12 and control the operation of the adjustment member 60 and the position and configuration of the guide member 40 using the wireless remote control 82 while visually inspecting the bucket elevator 12 and its operation. Also for example, depending on the type of communications link and signal strength employed, an operator could even control the operation of the adjustment member 60 and the position and configuration of the guide member 40 from a remote control or observation station located a substantial distance away from the bucket elevator 12.

It will be appreciated that the wireless remote control 82 may communicate with the transceiver/drive control 84 either via a direct communication link or indirectly over a suitable network. Thus, the example embodiments of the bucket elevator adjustable guide system 10, including the components of the control system 80, may comprise and/or may be utilized with one or more of the devices and/or communication networks described below.

Similarly, the wired remote control 82 may comprise a stationary or mobile device as described below, but electrically connected to the transceiver/drive control 84 via a wired connection 83. The wired remote control 82 may for example be mounted on, or connected or attached to, the enclosure or housing 14 of the bucket elevator 12 at a location that is readily accessible and removed from the moving components of the bucket elevator 12 to enable an operator to safely control the operation of the adjustment member and the position and configuration of the guide member 40 even while the bucket elevator 12 is operating. Alternatively, the wired remote control 82 could be located a substantial distance away from the bucket elevator 12 such as in a remote control or observation station.

In another example embodiment illustrated in FIG. 17, the control system 80 preferably comprises a sensor 85 and a remote auto-control unit 86. The example embodiment may also include a manual remote control 82 such as a wired or wireless remote control 82 as described above. The sensor 85 is coupled to and in communication with an operating component of the bucket elevator 12, for example a pulley drive motor 23. The sensor 85 is also coupled with and in communication with the remote auto-control unit 86. The sensor 85 also may be coupled with and in communication with the manual remote control 82. The remote auto-control unit 86 is in turn coupled with and in communication with the transceiver/drive control 84, which is in turn coupled with and in communication with the drive unit 74 both as described above. As described further below, the sensor 85, the remote auto-control unit 86, the transceiver/drive control 84, the drive unit 74, and the adjustment member 60 and guide member 40 are inter-coupled as and comprise a feedback control loop that is adapted and configured to remotely and automatically control the operation of the bucket elevator 12 in real-time as it operates.

The sensor 85 may be coupled to the component of the bucket elevator 12 and to the remote auto-control unit 86 electrically via suitable electrical wiring and connections, wirelessly via an RF or other type of wireless connection and using a suitable data protocol such as one of the protocols described below, optically, or in another suitable manner. The sensor 85 may also be directly coupled with and in communication with the remote auto-control unit 86, or indirectly coupled with and in communication with the remote auto-control unit 86, for example by a suitable network such as one or more of the telecommunication networks described below. Similarly, the remote auto-control unit 86 may be coupled with the transceiver/drive unit 84 electrically, wirelessly, optically, or in another suitable manner, and may be directly coupled with the transceiver/drive unit 84 or indirectly coupled with and in communication with the transceiver/drive unit 84, for example by a suitable network such as one or more of the telecommunication networks described below.

The sensor 85 is adapted and configured to sense and/or measure an operating parameter of the bucket elevator 12 as the bucket elevator 12 is in operation. Some operating parameters of the bucket elevator 12 vary with the operation of the bucket elevator 12 in a way that is correlated to the efficiency of the operation and/or the throughput of the operation. The efficiency and throughput of the bucket elevator 12 operation depends significantly on the position and configuration of the guide member 40 in the head housing 30. Accordingly, by sensing or measuring a suitable operating parameter, the sensor 85 can provide information that can be used by the remote auto-control unit 86 as feedback to control the adjustment member 60 to adjust the position and configuration of the guide member 40 to improve and optimize the efficiency and throughout of operation of the bucket elevator 12. More specifically, the sensor 85 can provide information that can be used by the remote auto-control unit 86 as feedback to remotely and automatically control the operation of the adjustment member 60 and the position and configuration of the guide member 40 to improve and optimize the efficiency and throughput of the bucket elevator 12 in real-time while the bucket elevator 12 is in operation and without the need for an operator to physically access the adjustment member 60 or the guide member 40.

As one example, the pulley drive motor 23 typically comprises an approximately 200-500 horsepower electric motor. In operation, such a motor draws a significant amount of electrical current to drive the upper and lower pulleys of the bucket elevator 12 to elevate the particulate material 13 from the lower portion 15 to the upper portion 16 of the bucket elevator 12 and to discharge it through the discharge chute 17 as shown in FIG. 10. In practice, electrical power constitutes a significant expense to operators of bucket elevators 12. It has been determined that in operation the point or range of most efficient operation of the pulley drive motor 23 coincides with it drawing the least amount of current. Thus, by operating the pulley drive motor 23 at its most efficient point or range, operators of bucket elevators 12 can realize substantial energy cost savings. It has also been determined that in operation as the pulley drive motor 23 operates more efficiently, the capacity and throughput of the bucket elevator 12 increases. Thus, by operating the pulley drive motor 23 at its point or range of greatest efficiency, the capacity and throughout of the bucket elevator 12 can be maximized or optimized.

The position and configuration of the guide member 40 has a significant bearing on the load placed on the pulley drive motor 23, and hence the current it draws and the efficiency at which it operates. As noted, the position and configuration of the guide member 40 thus has a significant bearing on the efficiency and throughput of the bucket elevator 12. Accordingly, by adjusting the position and configuration of the guide member 40 to minimize the load on the pulley drive motor 23, the efficiency at which the pulley drive motor 23 operates and the efficiency and throughout of the bucket elevator 12 can be maximized or optimized. For these reasons, the current drawn by the pulley drive motor 23 constitutes a particularly suitable operating parameter for the sensor 85 to sense and for the remote auto-control unit 86 to use to control the position of the guide member 40 and hence the operation of the bucket elevator 12.

With the foregoing in mind, an example flow of the basic operation of the example embodiment is illustrated in FIG. 18. With the bucket elevator 12 operating, the selected operating parameter is sensed or measured. The sensor 85 is adapted and configured to sense or measure the selected operating parameter, e.g., the current drawn by the pulley drive motor 23, and to communicate data representing the value thereof to the remote auto-control unit 86 as feedback information.

Using the sensed selected operating parameter, it is determined if the bucket elevator 12 is operating at maximum efficiency. The remote auto-control unit 86 is adapted and configured to receive the data from the sensor 85 and in response to determine the value of the sensed operating parameter. The remote auto-control unit 86 is further configured to process the value of the operating parameter to determine whether it indicates the bucket elevator 12 is operating less or more efficiently than it was previously, and whether the bucket elevator 12 is operating at maximum efficiency.

The remote auto-control unit 86 may be configured to compare the present value of the operating parameter against a value of the operating parameter determined previously during the same operation to determine if the present value indicates the bucket elevator 12 is operating more or less efficiently than indicated by the previous value. For example, when the current drawn by the pulley drive motor 23 is the sensed operating parameter, a present value that is less than the previous value indicates the bucket elevator 12 is operating more efficiently, whereas a present value that is greater than the previous value indicates the bucket elevator 12 is operating less efficiently.

A determination that the bucket elevator 12 is now operating more efficiently than it was previously may indicate that maximum operating efficiency has not yet been reached and that adjusting the position of the guide member 40 may result in increased operating efficiency. Similarly, a determination that the bucket elevator 12 is now operating less efficiently than it previously was may indicate that the position of the guide member 40 should be adjusted to increase operating efficiency. A determination that the bucket elevator 12 is now operating less efficiently following one or more previous determinations the bucket elevator 12 was operating more efficiently after the guide member 40 position was adjusted may indicate maximum operating efficiency has been achieved.

The remote auto-control unit 86 also may be configured to compare the present value of the operating parameter against a predetermined value or a previously stored value. This can be useful when the process is initiated and no previous value of the operating parameter from the same operation has yet been determined. For example, the present value may be compared to a previously stored value that was determined to correspond to operation of the bucket elevator 12 at a maximum or optimum level during a previous operation. Based on the comparison, the remote auto-control unit 86 can determine whether the bucket elevator 12 is operating at or about the anticipated maximum efficiency or at less than the anticipated maximum efficiency.

If it is not determined that the bucket elevator 12 is operating at maximum efficiency, the position of the guide member 40 is adjusted in a way to increase and maximize the operating efficiency. The remote auto-control unit 86 is configured to generate control commands or instructions to the transceiver/drive control 84 to operate the drive unit 74 to cause the adjustment member 60 to adjust the position and configuration of the guide member 40. For example, the remote auto-control unit 86 may be configured so that if it is determined that the present value of the operating parameter indicates the bucket elevator 12 is operating more efficiently than it was previously, the remote auto-control unit 86 issues commands to adjust the position of the guide member 40 in the same direction that previously produced increases in the operating efficiency in an attempt to further increase and maximize the operating efficiency (see FIGS. 8-9). However, if it is determined that the present value of the operating parameter indicates the bucket elevator 12 is operating less efficiently than it was previously, the remote auto-control unit 86 may issue commands to adjust the position of the guide member 40 to a previous position or in the opposite direction to attempt to increase the operating efficiency (see FIGS. 8-9).

If it is determined that the bucket elevator 12 is operating at maximum efficiency, the position of the guide member 40 may be maintained and need not necessarily be adjusted. Alternatively, if maximum operating efficiency is determined as described above by a determination of less efficiency following one or more determinations of increased efficiency, the position of the guide member 40 may be slightly adjusted back to the last position that resulted in a determination of an increase in operating efficiency as described above.

After the position of the guide member 40 has been adjusted or has been maintained because maximum operating efficiency is determined to have been achieved, the process returns to sensing or measuring the selected operating parameter and a new value of the operating parameter is determined. As described above, the remote auto-control unit 86 is configured to receive the new data from the sensor 85 and to determine a new value of the selected operating parameter, e.g., the current being drawn by the pulley drive motor 23. Also as described above, the remote auto-control unit 86 is configured to determine if the new value indicates the bucket elevator 12 is now operating less or more efficiently than it was prior to the position of the guide member 40 being adjusted, and whether the bucket elevator 12 is now operating or is continuing to operate at maximum efficiency. For example, although nothing in the operation of the bucket elevator 12 itself may have changed, conditions such as temperature or humidity may have changed and may require adjustment of the guide member 40 position to maintain or regain maximum operating efficiency. The process as described above may be repeated using the new value of the selected operating parameter and may continue indefinitely as long as additional adjustments to the position of the guide member 40 continue to result in new values of the operating parameter indicating increases in operating efficiency and until maximum operating efficiency is determined to have been achieved.

It will be appreciated that the basic operation of the example embodiment as described above comprises a closed feedback control loop. The remote auto-control unit 86 may be adapted and configured to continue to carry out the feedback control loop process as described above and as illustrated in FIG. 18 indefinitely for as long as the bucket elevator 12 continues to operate. It is noted that the remote auto-control unit 86 carries out the feedback control loop process to maximize or optimize the operating efficiency of the bucket elevator 12 remotely and automatically in real-time as the bucket elevator 12 continues to operate, and without the need for an operator to physically access the drive unit 74, the adjustment member 60, or the guide member 40.

It will also be appreciated that the foregoing describes the basic feedback control loop operation of the example embodiment and that various conventional data processing details that are not described nevertheless may be used to further improve the operation. For example, the sensor 85, the remote auto-control unit 86, or both may average or filter the data representing values of the selected operating parameter, e.g., the current drawn by the pulley drive motor 23, to eliminate "jitter" in the data and avoid constant unnecessary adjustment of the guide member 40. Similarly, the remote auto-control unit 86 may implement one or more threshold values or a hysteresis loop so that commands or instructions to adjust the position of the guide member 40 are only generated if a present value of the operating parameter varies by a predetermined amount, percentage, etc. from a previous discrete or average value of the operating parameter for example. Such data processing details are contemplated and do not depart from the scope and spirit of the example embodiment as described.

It will also be appreciated that the selected operational parameter need not be sensed or measured directly and that another parameter or physical characteristic related thereto may be sensed or measured instead to determine values of the selected operating parameter. Accordingly, the sensor 85 need not directly sense or measure the current drawn by the pulley drive motor 23 but may indirectly sense it by sensing or measuring one or more other physical characteristics related thereto. For example, a transformer may be in electrical circuit with the pulley drive motor 23 and the sensor 85 may sense or measure current in a tap of the transformer that is related to the current drawn by the motor 23. For another example, the sensor 85 may sense values of impedance that are related to the current actually drawn by the pulley drive motor 23.

It will also be appreciated that while the example embodiment and operation are described with respect to a particular operating parameter of the bucket elevator 12, i.e., the current drawn by the pulley drive motor 23, it is contemplated that other operating parameters or characteristics of other operating components of the bucket elevator 12 may be used instead or in addition provided they are relatable to the operating efficiency or throughput of the bucket elevator 12. Other such operating parameters or characteristics could potentially include other electrical parameters such as impedance, frequency, etc. associated with the motor 23, other motors, or other electrical components. Other such operating parameters or characteristics could also potentially include mechanical or physical elements such as rotational force or acceleration associated with the pulleys, strain or tension associated with the elongated flexible structure, the force at which the particulate material is ejected, etc. The use of such other operating parameters or characteristics is contemplated and does not depart from the scope and spirit of the example embodiment as described.

The sensor 85 may comprise any sensor that is suitable to sense or measure the selected operating parameter of the bucket elevator 12. For example, in the example embodiment described, the sensor 85 may comprise any sensor suitable for sensing or measuring electrical current of the type and magnitude anticipated to be drawn by the pulley drive motor 23. Such sensors may include but are not limited to shunt resistor and isolation amplifier type sensors, and magnetic sensors such as Hall Effect sensors.

The sensor 85 may sense or measure the operating parameter of the bucket elevator 12 continuously, periodically, or on demand. The sensor 85 also may transmit, send, or otherwise communicate the data comprising the feedback information to the remote auto-control unit 86 continuously, periodically, or on demand. Similarly, the remote auto-control unit 86 may be adapted and configured to receive the data from the sensor 85 continuously, periodically, or on demand. The remote auto-control unit 86 may further be configured to process the data dynamically and in real-time as it is received or periodically in batch-mode.

Similar to the wired and wireless remote controls 82, the remote auto-control unit 86 may comprise a stationary device or a mobile device as described below, and may be coupled to the transceiver/drive control 84 via a wired or a wireless connection. For example, the remote auto-control unit 86 can be mounted on, or connected or attached to or near, the enclosure or housing 14 of the bucket elevator 12. Alternatively, the wired remote control 82 could be located a substantial distance away from the bucket elevator 12 such as in a remote control or observation station.

The remote auto-control unit 86 may include certain preset values, commands and/or instructions if desired, which may be maintained in non-volatile memory for example. For example, the remote auto-control unit 86 may comprise one or more preset values, commands and/or instructions for the transceiver/drive control 84 to cause the adjustment member 60 to position the guide member 40 in one or more selectable starting positions or to return the guide member 40 to a selected previous position.

Preferably, the remote auto-control unit 86 is adapted and configured to be selectively activated by an operator. The remote auto-control unit 86 can be adapted and configured so that upon activation by an operator, it automatically causes the guide member 40 to be positioned in a predetermined starting position, or alternatively prompts the operator to select a predetermined position for the guide member 40 to be placed in before beginning to execute the automatic feedback control loop process described above. The remote auto-control unit 86 also is preferably adapted and configured to be selectively de-activated by an operator in favor of the operator manually controlling the position of the guide member 40 using the manual remote control 82. The remote auto-control unit 86 also may be activated and used in combination with the manual remote control 82. For example, the manual remote control 82 may be used to manually place the guide member 40 in a desired starting position and the remote auto-control 86 then activated to automatically adjust the position of the guide member 40 during continued operation of the bucket elevator 12.

It will be appreciated that FIG. 17 illustrates a functional diagram of the example embodiment of the control system 80 and that the various components illustrated therein and described above may be split or combined in various ways. As but one example, the sensor 85 may be in direct communication with the transceiver/drive control 84 and one or more functions of the intermediate remote auto-control unit 86 may be incorporated in the sensor 85 and/or the transceiver/drive control 84. All such variations are contemplated and can be made without departing from the spirit and scope of the example embodiment as described herein.

G. Exemplary Telecommunications Networks

The bucket elevator adjustable guide system 10 may be utilized with or upon any telecommunications network capable of transmitting data. Examples of suitable telecommunications networks for the bucket elevator adjustable guide system 10 include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The bucket elevator adjustable guide system 10 may communicate via a single telecommunications network or multiple telecommunications networks concurrently. Various protocols may be utilized by the electronic devices for communications such as but not limited to HTTP, SMTP, FTP and WAP (wireless Application Protocol). The bucket elevator adjustable guide system 10 may be implemented upon or utilizing various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The bucket elevator adjustable guide system 10 may also be utilized with online services and internet service providers.

The Internet is an exemplary telecommunications network suitable for use with the bucket elevator adjustable guide system 10. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

H. Central Communication Unit

A network utilized by or with the bucket elevator adjustable guide system 10 may comprise one or more central communication units. A central communication unit may be comprised of any central communication site with which communications may be established. A central communication unit may be comprised of a server computer, cloud based computer, virtual computer, home computer or other computer system capable of receiving and transmitting data via IP networks and the telecommunication networks. As can be appreciated, a modem or other communication device may be required between each central communication unit and corresponding telecommunication networks. A central communication unit may be comprised of any electronic system capable of receiving and transmitting information (e.g. voice data, computer data, etc.).

I. Mobile Device

A network utilized by or with the bucket elevator adjustable guide system 10 also may comprise one or more mobile devices, which may comprise remote controls 82 and/or remote auto-control 86 for example. A mobile device may be comprised of any type of computer for practicing the various aspects of the bucket elevator adjustable guide system 10. For example, the mobile device can be a personal computer (e.g. APPLE® based computer, an IBM based computer, or compatible thereof) or tablet computer (e.g. IPAD®). A mobile device may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

A mobile device may be comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the bucket elevator adjustable guide system. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

J. Operation of Preferred Embodiment

In use, the head housing 30 is connected or attached to the upper portion 16 of the enclosure or housing 14 of the bucket elevator 12 with the lower openings 36 of the head housing 30 in communication with the openings 19 in the upper portion 16 of the enclosure or housing 14 and the head housing 30 arranged relative to the buckets 24 as illustrated in FIG. 10. The discharge chute 17 is connected or attached to the head housing 30 in communication with the discharge opening 37 of the head housing 30 also as shown in FIG. 10 for example.

The operator then initiates operation of the bucket elevator 12 to begin transferring the particulate material 13 from the boot in the lower portion 15 of the bucket elevator 12 into the discharge chute 17 via the buckets 24 as described herein. In operation, the buckets 24 move upwardly along the upward moving run of the elongated flexible structure 22 thereby creating an upward air movement within the upward leg of the bucket elevator 12. The upward moving air flows through the lower vent 46 between the exterior surface 43 of the guide member 40 and the interior surfaces of the head housing 30 and then through the upper vent 48. The air movement from the lower vent 46 to and through the upper vent 48 helps decrease unwanted dispersion of the particulate material 13 at the location of discharge by providing a natural air flow around the particulate material 13. The air movement from the lower vent 46 to and through the upper vent 48 also prevents the accumulation of particulate material 13, dust, and other particles.

As the bucket elevator 12 operates, the operator may monitor the discharge characteristics of the particulate material 13, including for example the flow rate, the dispersion of particulate material 13, and possibly the return of particulate material 13 to the boot. The operator may use the remote control 82 to remotely communicate with the transceiver/drive control 84 to control the operation of the drive unit 74 to drive the adjustment member 60 to adjust the position and configuration of the guide member 40 within the head housing 30 as described herein. Using the remote control 82, the operator may control the drive unit 74, adjustment member 60, and guide member 40 on the fly as the bucket elevator 12 is operating and without physically accessing or interacting with the drive unit 74, adjustment member 60, or guide member 40.

Alternatively, the operator may activate the remote auto-control unit 86. Once activated, the remote auto-control unit 86 automatically monitors the operation of the bucket elevator 12 and automatically adjusts the position and configuration of the guide member 40 without further involvement of the operator to automatically maximize the operating efficiency of the bucket elevator 12 as described herein. Like the manual remote control 82, the remote auto-control unit 86 automatically adjusts the position of the guide member 40 to maximize the operating efficiency of the bucket elevator 12 without the operator physically accessing or interacting with the drive unit 74, the adjustment member 60, or the guide member 40.

If the operator elects to control operation of the bucket elevator 12 manually, then as the operator makes adjustments to the position and configuration of the guide member 40 using the remote control 82, the operator may continue to monitor the discharge characteristics of the particulate material 13 and to make further adjustments manually as needed or desired. When the operator is satisfied with the discharge characteristics, for example having observed that an optimum or maximum flow rate has been achieved, the operator may discontinue making adjustments and allow the bucket elevator 12 to continue operating. Of course, if the operator subsequently observes that conditions have changed or that the discharge characteristics have changed, the operator may make additional adjustments manually using the remote control 82 to alter the operation as desired again without physically accessing or interacting with the drive unit 74, adjustment member 60, or guide member 40.

Alternatively, if the operator elects for operation of the bucket elevator 12 to be controlled automatically by the remote auto-control unit 86, then the operator need not continue to observe the operation of the bucket elevator 12 and manually initiate adjustments to the position of the guide member 40. However, the operator can at any time deactivate the remote auto-control unit 86 and revert to manual control using the remote control 82.

It will be appreciated that based on past experience with the same conditions and particulate material 13, or for some other reason, the operator may use the remote control 82 to control the drive unit 74 and adjustment member 60 to place the guide member 40 in a starting position and configuration before initiating operation of the bucket elevator 12. The operator may subsequently use the remote control 82 as the bucket elevator 12 is operating to further adjust the position and configuration of the guide member 40 from the starting position as necessary or desired. Alternatively, after the operator has used the remote control 82 to pre-position the guide member 40, the operator may subsequently activate the remote auto-control unit 86 and allow it to thereafter automatically control further adjustments to the position of the guide member 40.

When a transfer operation has been completed, the operator may deactivate the remote auto-control unit 86 if it was previously activated. The operator may if desired use the remote control 82 to control the drive unit 74 and adjustment member 60 to move the guide member 40 back to its pre-operation starting position and configuration. Alternatively, the operator may use the remote control 82 to move the guide member 40 into a new position and configuration in anticipation of another transfer operation with a different particulate material 13.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The present invention may be embodied in forms other than the example embodiments described herein without departing from the spirit or essential attributes thereof, and it is therefore desired that the described example embodiments be considered in all respects as illustrative and not restrictive. Many modifications and other embodiments of the bucket elevator adjustable guide system will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Further, although methods and materials similar to or equivalent to those described herein can be used in the practice or testing of the bucket elevator adjustable guide system, suitable methods and materials are described above. Thus, the bucket elevator adjustable guide system is not intended to be limited to the specific example embodiments shown and described, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

At least one embodiment of the bucket elevator adjustable guide system is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, the computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

What is claimed is:

1. An adjustable guide system for a bucket elevator, comprising:
    a head housing with an interior space, a first opening adapted for receiving particulate material to be dispensed from a bucket elevator and a second opening adapted for discharging the particulate material;
    an adjustable guide member disposed at least partially within the interior space for guiding the particulate material to the second opening;
    a plurality of shafts connected to the adjustable guide member;
    a plurality of actuators, wherein each of the plurality of shafts has a proximal end portion pivotably connected to a portion of the adjustable guide member at a spaced apart location and a distal end portion coupled to one of the plurality of actuators, and wherein each of the plurality of actuators is adapted to independently selectively cause one shaft of the plurality of shafts to adjust a position of the adjustable guide member; and
    a remote control adapted to remotely control the plurality of actuators to selectively extend and retract the plurality of shafts to selectively adjust the position of the adjustable guide member in relation to the head housing.

2. The adjustable guide system of claim 1, wherein the remote control comprises a mobile device.

3. The adjustable guide system of claim 1, wherein the remote control is adapted to remotely control the plurality of actuators wirelessly.

4. The adjustable guide system for a bucket elevator of claim 1, wherein the remote control is adapted to remotely control the plurality of actuators via wired connection.

5. The adjustable guide system of claim 1, wherein the plurality of shafts are each pivotably connected to the adjustable guide member.

6. The adjustable guide system of claim 1, wherein the plurality of shafts are each pivotably connected to the adjustable guide member by a pivotable connection at a plurality of spaced apart connection points.

7. The adjustable guide system of claim 1, wherein the plurality of actuators are each comprised of an electromechanical actuator.

8. An adjustable guide system for a bucket elevator, comprising:
    a head housing;
    an adjustable guide member disposed at least partially within the head housing;
    an actuator connected to the adjustable guide member, wherein the actuator is adapted to selectively adjust a position of the adjustable guide member relative to the head housing; and
    a remote auto-control in communication with the actuator, wherein the remote auto-control is adapted and configured to monitor an operating parameter of the bucket elevator and in response to automatically control the actuator to adjust the position of the adjustable guide member to maximize an operating efficiency of the bucket elevator.

9. The adjustable guide system of claim 8, wherein a configuration of the adjustable guide member can be adjusted without the adjustable guide member being physically accessed by a user.

10. The adjustable guide system of claim 8, wherein the adjustable guide member comprises a substantially flat sheet of material arranged in a curved arc.

11. The adjustable guide system of claim 8, including a shaft extending between the actuator and the adjustable guide member, wherein the shaft is adapted to adjust the position of the adjustable guide member relative to the head housing in a first direction by extending the shaft, and to adjust the position of the adjustable guide member in a second direction by retracting the shaft.

12. The adjustable guide system of claim 8, including an adjustment member extending between the actuator and the adjustable guide member, wherein the adjustment member is connected to the adjustable guide member by a pivotable connection at a connection point.

13. The adjustable guide system of claim 8, wherein the remote auto-control is adapted to remotely control the actuator wirelessly.

14. The adjustable guide system of claim 8, wherein the actuator is comprised of an electromechanical actuator.

15. An adjustable guide system for a bucket elevator, comprising:
a head housing;
an adjustable guide member disposed at least partially within the head housing;
an actuator connected to the adjustable guide member, wherein the actuator is adapted to selectively adjust a position of the adjustable guide member relative to the head housing; and
a remote auto-control in communication with the actuator, wherein the remote auto-control is adapted and configured to monitor an operating parameter of the bucket elevator and in response to automatically control the actuator to adjust the position of the adjustable guide member.

16. The adjustable guide system of claim 15, wherein a configuration of the adjustable guide member can be adjusted without the adjustable guide member being physically accessed by a user.

17. The adjustable guide system of claim 15, wherein the adjustable guide member comprises a substantially flat sheet of material arranged in a curved arc.

18. The adjustable guide system of claim 15, including a shaft extending between the actuator and the adjustable guide member, wherein the shaft is adapted to adjust the position of the adjustable guide member relative to the head housing in a first direction by extending the shaft, and to adjust the position of the adjustable guide member in a second direction by retracting the shaft.

19. The adjustable guide system of claim 15, wherein the remote auto-control is adapted to remotely control the actuator wirelessly.

20. The adjustable guide system of claim 15, wherein the actuator is comprised of an electromechanical actuator.

\* \* \* \* \*